United States Patent
Chien et al.

(10) Patent No.: US 9,974,036 B2
(45) Date of Patent: May 15, 2018

(54) DIRECT COMMUNICATION NETWORK SYSTEM AND SIGNAL SYNCHRONIZATION METHOD THEREOF

(71) Applicant: Institute For Information Industry, Taipei (TW)

(72) Inventors: Chun-Che Chien, Taipei (TW); Shu-Tsz Liu, Taipei (TW)

(73) Assignee: Institute For Information Industry, Taipei (TW)

( * ) Notice: Subject to any disclaimer, the term of this patent is extended or adjusted under 35 U.S.C. 154(b) by 37 days.

(21) Appl. No.: 14/932,961

(22) Filed: Nov. 4, 2015

(65) Prior Publication Data
US 2016/0128013 A1 May 5, 2016

Related U.S. Application Data

(60) Provisional application No. 62/075,271, filed on Nov. 5, 2014.

(51) Int. Cl.
*H04L 7/00* (2006.01)
*H04W 56/00* (2009.01)
*H04W 76/02* (2009.01)

(52) U.S. Cl.
CPC .... *H04W 56/0015* (2013.01); *H04W 56/0035* (2013.01); *H04W 76/023* (2013.01)

(58) Field of Classification Search
CPC ........... H04W 56/001; H04W 56/0015; H04W 56/0035; H04W 24/10; H04W 56/002;
(Continued)

(56) References Cited

U.S. PATENT DOCUMENTS

| | | |
|---|---|---|
| 8,090,363 B2 | 1/2012 | Clark et al. |
| 2013/0336307 A1 | 12/2013 | Park et al. |

(Continued)

FOREIGN PATENT DOCUMENTS

| | | |
|---|---|---|
| EP | 2665325 B1 | 11/2013 |
| TW | 201330682 A1 | 7/2013 |
| WO | 2014047907 A1 | 4/2014 |

OTHER PUBLICATIONS

Office Action to the corresponding Taiwan Patent Application rendered by the Taiwan Intellectual Property Office (TIPO) dated Dec. 20, 2016, 8 pages.

*Primary Examiner* — Sam K Ahn
*Assistant Examiner* — Amneet Singh
(74) *Attorney, Agent, or Firm* — Skaar Ulbrich Macari, P.A.

(57) ABSTRACT

A direct communication network system and a signal synchronization method thereof are provided. The direct communication network system includes a first direct communication apparatus and a second direct communication apparatus. The first direct communication apparatus synchronizes with a base station within communication coverage of the base station. The second direct communication apparatus synchronizes with the first direct communication apparatus outside the communication coverage of the base station according to at least one first synchronization signal of the first direct communication apparatus. The first direct communication apparatus determines an abnormal synchronization status with the base station, and adjusts a transmitting status of the at least one first synchronization signal. The second direct communication apparatus switches synchronization to a third direct communication apparatus according to the transmitting status of the at least one first synchronization signal and synchronizes with the third direct com-
(Continued)

munication apparatus via at least one second synchronization signal.

3 Claims, 21 Drawing Sheets

(58) Field of Classification Search
CPC ............... H04W 72/048; H04W 4/005; H04W 72/0406; H04W 72/0413; H04W 72/042; H04W 72/0446; H04W 76/021; H04W 76/023; H04W 76/025; H04W 56/0005; H04W 76/02
See application file for complete search history.

(56) References Cited

U.S. PATENT DOCUMENTS

| | | | |
|---|---|---|---|
| 2015/0016354 A1* | 1/2015 | Yie | H04L 5/003 370/329 |
| 2015/0208371 A1* | 7/2015 | Yie | H04W 4/008 370/329 |
| 2015/0264588 A1* | 9/2015 | Li | H04W 56/0015 370/350 |
| 2016/0087743 A1* | 3/2016 | El Ayach | H04W 52/242 455/452.1 |
| 2016/0095074 A1* | 3/2016 | Park | H04W 8/005 370/350 |
| 2016/0198289 A1* | 7/2016 | Sorrentino | H04W 4/005 455/41.2 |
| 2016/0295533 A1* | 10/2016 | Sorrentino | H04W 56/001 |
| 2016/0316487 A1* | 10/2016 | Kalhan | H04W 72/1278 |
| 2017/0013578 A1* | 1/2017 | Wei | H04W 8/005 |

* cited by examiner

```
┌─────────────────────────────────────────┐
│ Enabling the first direct communication │
│ apparatus to determine that an abnormal │
│  synchronization status occurs between  │
│        the first direct                 │
│ communication apparatus and the base station │
│                                    1201 │
└─────────────────────────────────────────┘
                    │
                    ▼
┌─────────────────────────────────────────┐
│ Enabling the first direct communication │
│  apparatus to adjust the at least one   │
│      first synchronization              │
│  signal according to a sequence format  │
│                                    1202 │
└─────────────────────────────────────────┘
                    │
                    ▼
┌─────────────────────────────────────────┐
│   Enabling the second direct communication │
│  apparatus to stop receiving the at least one first │
│  synchronization signal according to the at least one │
│   first synchronization signal adjusted by the │
│              sequence format       1203 │
└─────────────────────────────────────────┘
                    │
                    ▼
┌─────────────────────────────────────────┐
│    Enabling the second direct communication │
│  apparatus to switch synchronization to the third │
│   direct communication apparatus and synchronize │
│   with the third direct communication apparatus │
│        according to the at least one second │
│       synchronization signal of the third direct │
│         communication apparatus    1204 │
└─────────────────────────────────────────┘
```

FIG. 12

DIRECT COMMUNICATION NETWORK SYSTEM AND SIGNAL SYNCHRONIZATION METHOD THEREOF

PRIORITY

This application claims priority to U.S. Provisional Patent Application No. 62/075,271 filed on Nov. 5, 2014, which is hereby incorporated by reference in its entirety.

FIELD

The present invention relates to a direct communication network system and a signal synchronization method thereof. More particularly, the present invention relates to a direct communication network system and a signal synchronization method thereof for dealing with synchronization signal source abnormalities.

BACKGROUND

In direct communication systems, signal synchronization is very important for data transmissions because good communication quality can be ensured only on the basis of a correct synchronization status among direct communication apparatuses. Referring to FIG. 1, in a conventional direct communication system 1, a direct communication apparatus 13 located within communication coverage within the base station 11 is synchronized directly with the base station 11, while a direct communication apparatus 15 located outside the communication coverage of the base station 11 may accomplish the synchronization process according to a synchronization signal forwarded by the direct communication apparatus 13 located within the communication coverage of the base station 11.

However, in the current direct communication technologies, an abnormal synchronization status between the direct communication apparatus 13 and the base station 11 (e.g., signal shielding, signal interference, a low power level of the direct communication apparatus 13, or a temporary abnormal status of the synchronization circuit) might cause an error in synchronization of the direct communication apparatus 13. Consequently, reliability of the synchronization process of the direct communication apparatus 15 that is synchronized via the direct communication apparatus 13 will also be affected, and this significantly degrades the synchronization effectiveness of the whole network.

Accordingly, a need exists in the art to overcome the aforesaid shortcoming of the conventional direct communication system so that the synchronization reliability of the direct communication apparatus located outside the communication coverage of the base station can still be maintained when the direct communication apparatus located within the communication coverage of the base station experiences an abnormal synchronization status.

SUMMARY

The disclosure includes a signal synchronization method for a direct communication network system. The direct communication network system comprises a first direct communication apparatus and a second direct communication apparatus. The first direct communication apparatus synchronizes with a base station within communication coverage of the base station. The second direct communication apparatus synchronizes with the first direct communication apparatus outside the communication coverage of the base station according to at least one first synchronization signal of the first direct communication apparatus. The signal synchronization method comprises the following steps of: (a) enabling the first direct communication apparatus to determine that an abnormal synchronization status occurs between the first direct communication apparatus and the base station, wherein the abnormal synchronization signal is one of a synchronization interruption status and an abnormal synchronization signal source status; (b) enabling the first direct communication apparatus to adjust a transmitting status of the at least one first synchronization signal after the step (a); and (c) enabling the second direct communication apparatus to, after the step (b), switch synchronization to a third direct communication apparatus according to the transmitting status of the at least one first synchronization signal and synchronize with the third direct communication apparatus according to at least one second synchronization signal of the third direct communication apparatus.

The disclosure includes a direct communication network system, which comprises a first direct communication apparatus and a second direct communication apparatus. The first direct communication apparatus synchronizes with a base station within communication coverage of the base station. The second direct communication apparatus synchronizes with the first direct communication apparatus outside the communication coverage of the base station according to at least one first synchronization signal of the first direct communication apparatus. The first direct communication apparatus determines that an abnormal synchronization status occurs between the first direct communication apparatus and the base station and adjusts a transmitting status of the at least one first synchronization signal, wherein the abnormal synchronization signal is one of a synchronization interruption status and an abnormal synchronization signal source status. The second direct communication apparatus switches synchronization to a third direct communication apparatus according to the transmitting status of the at least one first synchronization signal and synchronizes with the third direct communication apparatus according to at least one second synchronization signal of the third direct communication apparatus.

The disclosure includes a signal synchronization method for a direct communication network system. The direct communication network system comprises a first direct communication apparatus and a second direct communication apparatus. The first direct communication apparatus synchronizes with a base station within communication coverage of the base station. The second direct communication apparatus synchronizes with the first direct communication apparatus outside the communication coverage of the base station according to at least one first synchronization signal of the first direct communication apparatus. The signal synchronization method comprises the following steps of: (a) enabling the first direct communication apparatus to determine that an abnormal synchronization status occurs between the first direct communication apparatus and the base station, wherein the abnormal synchronization signal is one of a synchronization interruption status and an abnormal synchronization signal source status; (b) enabling the first direct communication apparatus to, after the step (a), switch synchronization to a third direct communication apparatus and synchronize with the third direct communication apparatus according to at least one second synchronization signal of the third direct communication apparatus; (c) enabling the first direct communication apparatus to transmit at least one third synchronization signal to the second direct communication apparatus after the step (b);

and (d) enabling the second direct communication apparatus to synchronize with the first direct communication apparatus according to the at least one third synchronization signal.

The disclosure further includes a direct communication network system, which comprises a first direct communication apparatus and a second direct communication apparatus. The first direct communication apparatus synchronizes with a base station within communication coverage of the base station. The second direct communication apparatus synchronizes with the first direct communication apparatus outside the communication coverage of the base station according to at least one first synchronization signal of the first direct communication apparatus. The first direct communication apparatus determines that an abnormal synchronization status occurs between the first direct communication apparatus and the base station, and switches synchronization to a third direct communication apparatus to synchronize with the third direct communication apparatus according to at least one second synchronization signal of the third direct communication apparatus. The abnormal synchronization signal is one of a synchronization interruption status and an abnormal synchronization signal source status. The first direct communication apparatus transmits at least one third synchronization signal to the second direct communication apparatus. The second direct communication apparatus synchronizes with the first direct communication apparatus according to the at least one third synchronization signal.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 12 is a flowchart diagram of a signal synchronization method according to an eleventh embodiment of the present invention;

DETAILED DESCRIPTION

In the following description, the present invention will be explained with reference to certain example embodiments thereof. However, these example embodiments are not intended to limit the present invention to any specific examples, embodiments environment, applications or particular implementations described in these example embodiments. Therefore, description of these example embodiments is only for purpose of illustration rather than to limit the present invention, and the scope of the present invention shall be governed by the claims. In the following example embodiments and the attached drawings, elements unrelated to the present invention are omitted from depiction; and dimensional relationships among individual elements in the attached drawings are illustrated only for ease of understanding, but not to limit the actual scale.

Figure 1:
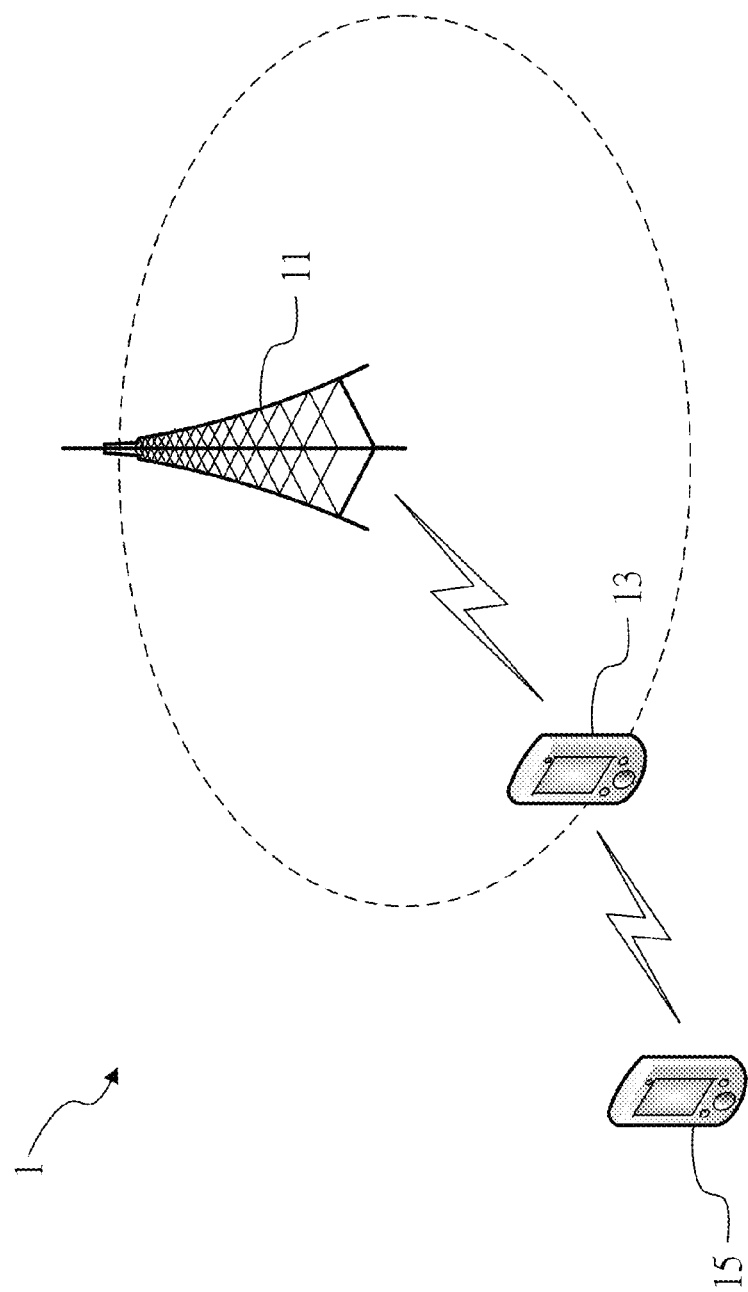
FIG. 1 is a schematic view of a direct communication network system of the prior art.
Figure 2A:
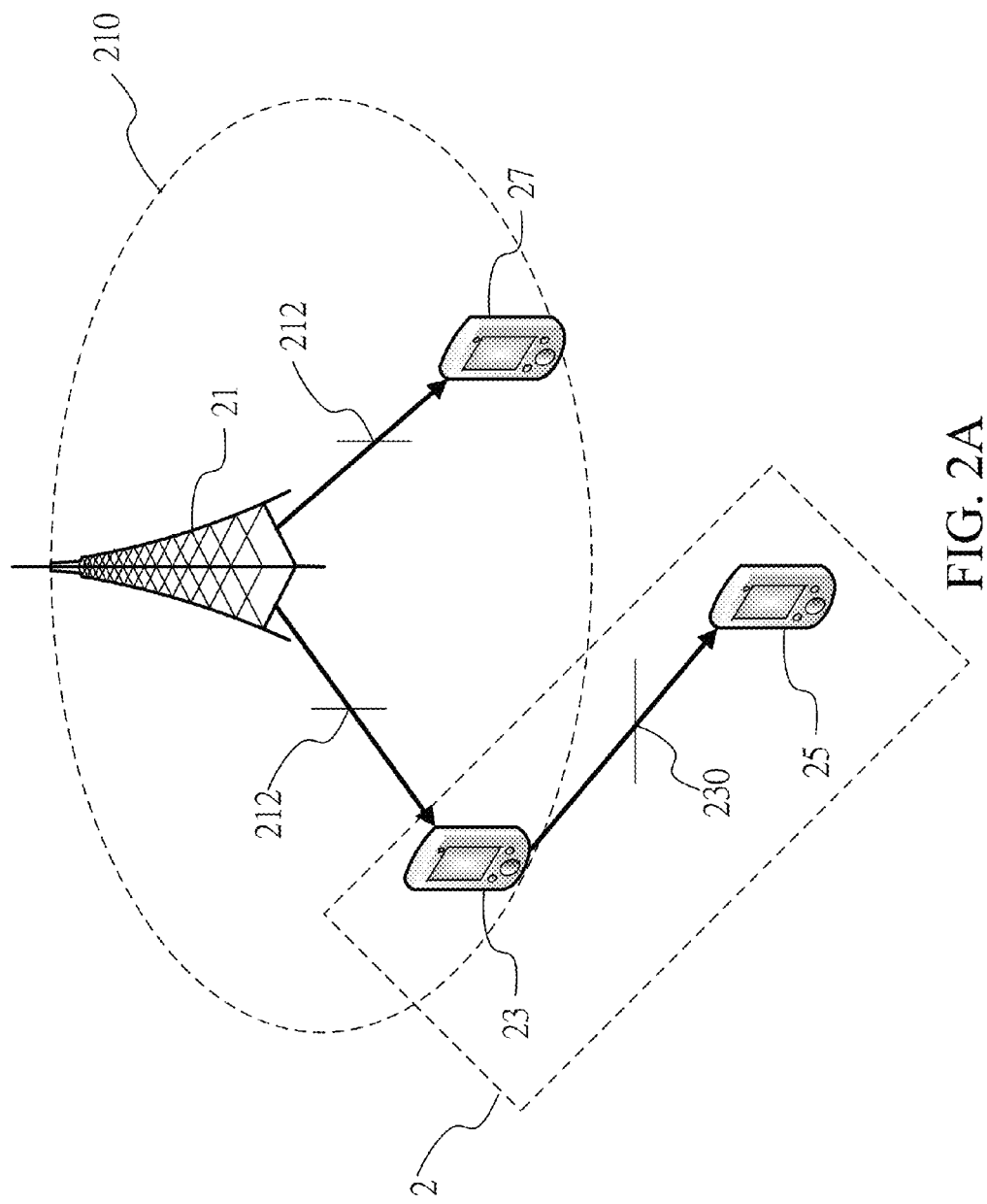
FIG. 2A is a schematic view of a direct communication network system according to a first embodiment of the present invention.
Figure 2B:
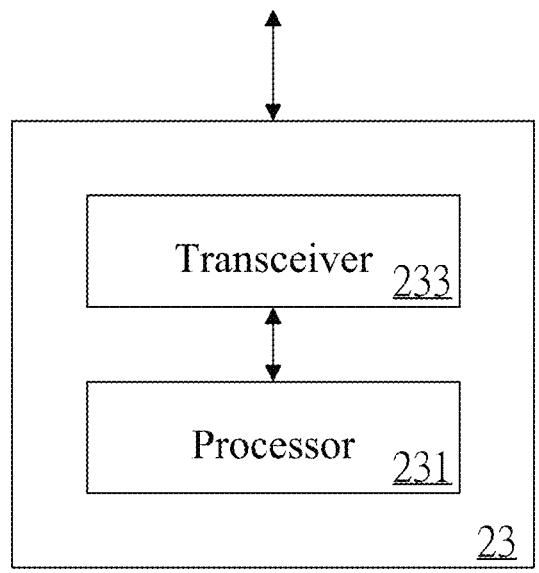
FIG. 2B is a block diagram of a first direct communication apparatus according to the first embodiment of the present invention.
Figure 2C:
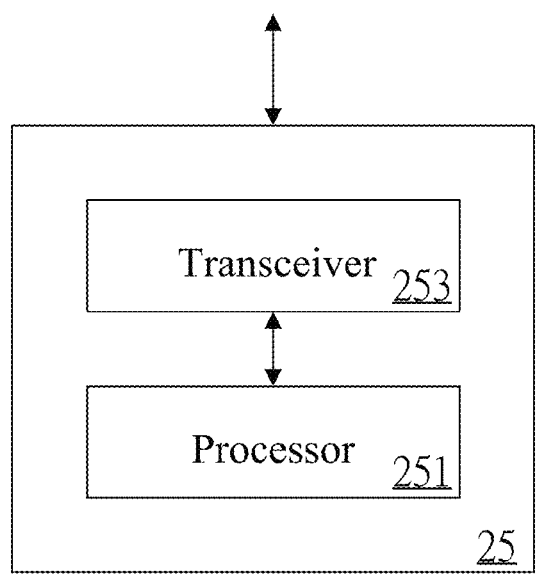
FIG. 2C is a block diagram of a second direct communication apparatus according to the first embodiment of the present invention.

Please refer to FIGS. 2A~2C first. FIG. 2A is a schematic view of a direct communication network system 2 according to a first embodiment of the present invention. The direct communication network system 2 comprises a first direct communication apparatus 23 and a second direct communication apparatus 25. FIG. 2B is a block diagram of the first direct communication apparatus 23 of the present invention, and the first direct communication apparatus 23 comprises a processor 231 and a transceiver 233. FIG. 2C is a block diagram of the second direct communication apparatus 25 of the present invention, and the second direct communication apparatus 25 comprises a processor 251 and a transceiver 253. Interactions of the direct communication network system 2 and components thereof will be further described hereinbelow.

Firstly, as shown in FIG. 2A, the first direct communication apparatus 23 receives at least one synchronization signal 212 of a base station 21 within communication coverage 210 of the base station 21 and synchronizes with the base station 21 accordingly. The second direct communication apparatus 25 receives at least one first synchronization signal 230 of the first direct communication apparatus 23 via the transceiver 253 outside the communication coverage 210 of the base station 21 and synchronizes with the first direct communication apparatus 23 accordingly. It shall be firstly noted that, the network system further comprises a third direct communication apparatus 27 which is also located within the communication coverage 210 of the base station 21, and the third direct communication apparatus 27 receives at least one synchronization signal 212 from the base station 21 and synchronizes with the base station 21 accordingly.

Figure 2D:
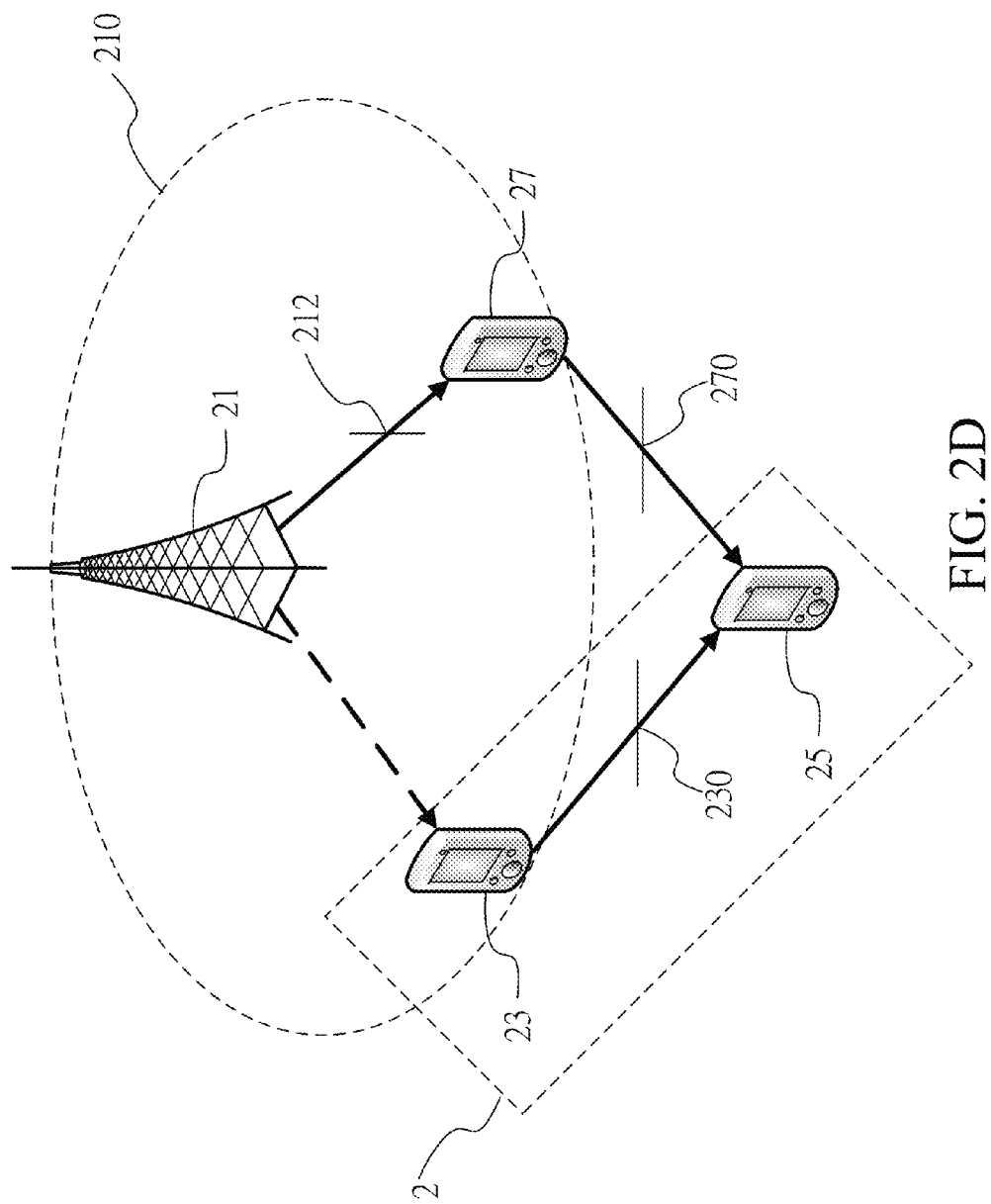
FIG. 2D is another schematic view of the direct communication network system according to the first embodiment of the present invention.

Please refer next to FIG. 2D, which is another schematic view of the direct communication network system 2 according to the first embodiment of the present invention. In detail, if the transceiver 233 of the first direct communication apparatus 23 fails to receive at least one synchronization signal of the base station 21 during the synchronization process, the processor 231 can determine that an abnormal synchronization status occurs between the first direct communication apparatus 23 and the base station 21 (as shown by a dashed line between the base station 21 and the first direct communication apparatus 23).

It shall be particularly noted that, the abnormal synchronization status may be a synchronization interruption status, for example, when the user equipment (UE) moves into a basement where the synchronization signal from the base station is shielded. Or, the abnormal synchronization status may be an abnormal synchronization signal source status, for example, when the direct communication apparatus moves to a place where the signal of the base station is too weak to cause incomplete signal reception, accuracy of the synchronization signal is inadequate due to several times of forwarding, the synchronization signal is not directly from the base station (e.g., the synchronization signal is from a mobile station within the communication coverage of the base station), the transmission power of the synchronization signal source is insufficient, etc. However, these are not intended to limit forms of synchronization interruptions or abnormal synchronization signal source statuses, and those skilled in the art can readily understand possible forms of synchronization interruptions and abnormal synchronization signal source statuses.

Then, the processor 231 of the first direct communication apparatus 23 can adjust a transmitting status of the at least one first synchronization signal 230 via the transceiver 233 to notify the second direct communication apparatus 25, which synchronizes to the first direct communication apparatus 23, to switch synchronization. On the other hand, the second direct communication apparatus 25 performs synchronization mainly according to the at least one first synchronization signal 230, so the processor 251 of the second direct communication apparatus 25 knows that switching of the synchronization signal source shall be done once it determines that the transmitting status of the at least one first synchronization signal 230 has been adjusted.

More specifically, if the second direct communication apparatus 25 determines that the third direct communication apparatus 27 is in a normal synchronization status according to at least one second synchronization signal 270 of the third direct communication apparatus 27, then the second direct communication apparatus 25 may switch synchronization to the third direct communication apparatus 27 via the transceiver 253 and synchronizes to the third direct communication apparatus 27 according to the at least one second synchronization signal 270 of the third direct communication apparatus 27. Thereby, the case that the second direct communication apparatus 25 continues to synchronize with the first direct communication apparatus 23, which has already failed to normally synchronize with the base station 21, to cause an abnormal synchronization status can be avoided.

Figure 3A:
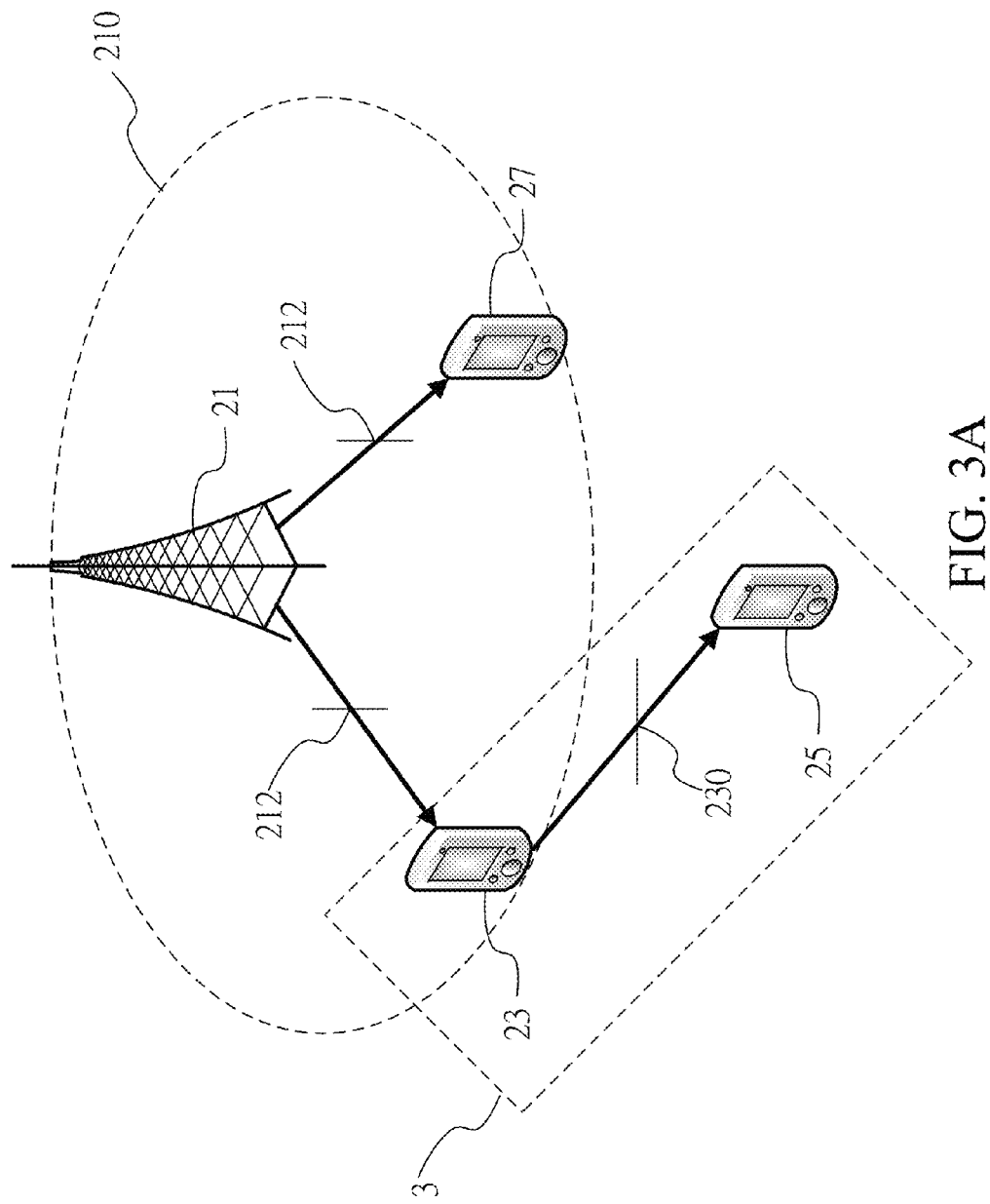
FIG. 3A is a schematic view of a direct communication network system according to a second embodiment of the present invention.
Figure 3B:
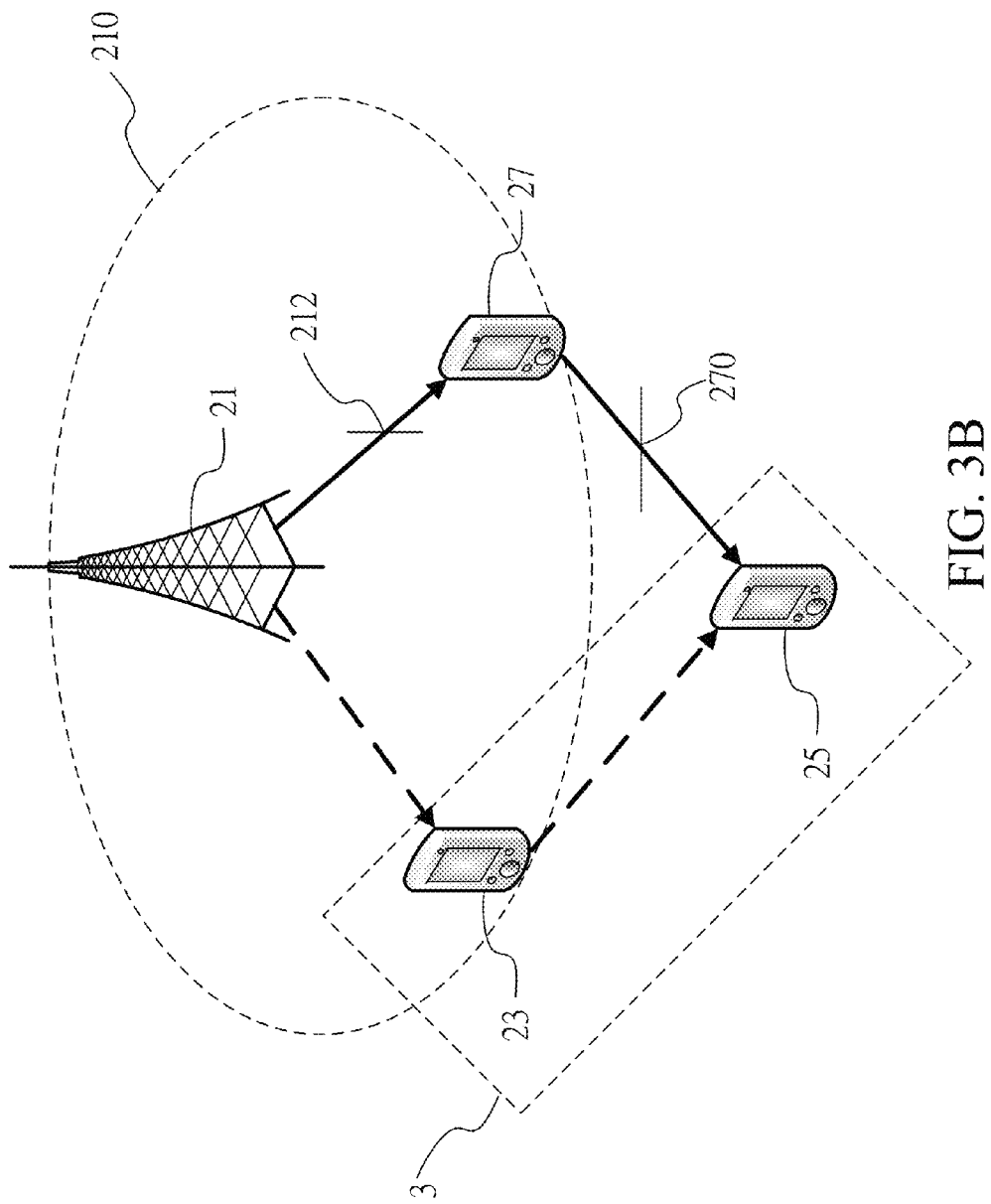
FIG. 3B is another schematic view of the direct communication network system according to the second embodiment of the present invention.

Please refer to FIGS. 3A~3B, which are schematic views of a direct communication network system 3 according to a second embodiment of the present invention. The framework of the second embodiment is similar to that of the first embodiment, so elements bearing the same symbols also have the same functions and will not be described again herein. The second embodiment will mainly describe the technology of coping with the abnormal synchronization statuses in more detail.

Similarly, as shown in FIG. 3A, the first direct communication apparatus 23 receives at least one synchronization signal 212 from the base station 21 via the transceiver 233 within the communication coverage 210 of the base station 21 and synchronizes with the base station 21 accordingly. The second direct communication apparatus 25 receives at least one first synchronization signal 230 from the first direct communication apparatus 23 via the transceiver 253 outside the communication coverage 210 of the base station 21 and synchronizes with the first direct communication apparatus 23 accordingly.

Referring next to FIG. 3B, if the transceiver 233 of the first direct communication apparatus 23 fails to normally receive at least one synchronization signal 212 of the base station 21 during the continuous synchronization process, the processor 231 can determine that an abnormal synchronization status occurs between the first direct communication apparatus 23 and the base station 21. Then, the processor 231 of the first direct communication apparatus 23 can stop transmitting the at least one first synchronization signal 230 via the transceiver 233.

If, after stopping receiving the at least one first synchronization signal 230, the second direct communication apparatus 25 determines that the third direct communication apparatus 27 is in a normal synchronization status according to at least one second synchronization signal 270 of the third direct communication apparatus 27, then the second direct communication apparatus 25 may switch synchronization to the third direct communication apparatus 27 via the transceiver 253 and synchronizes to the third direct communication apparatus 27 according to the at least one second synchronization signal 270 of the third direct communication apparatus 27.

Figure 4A:
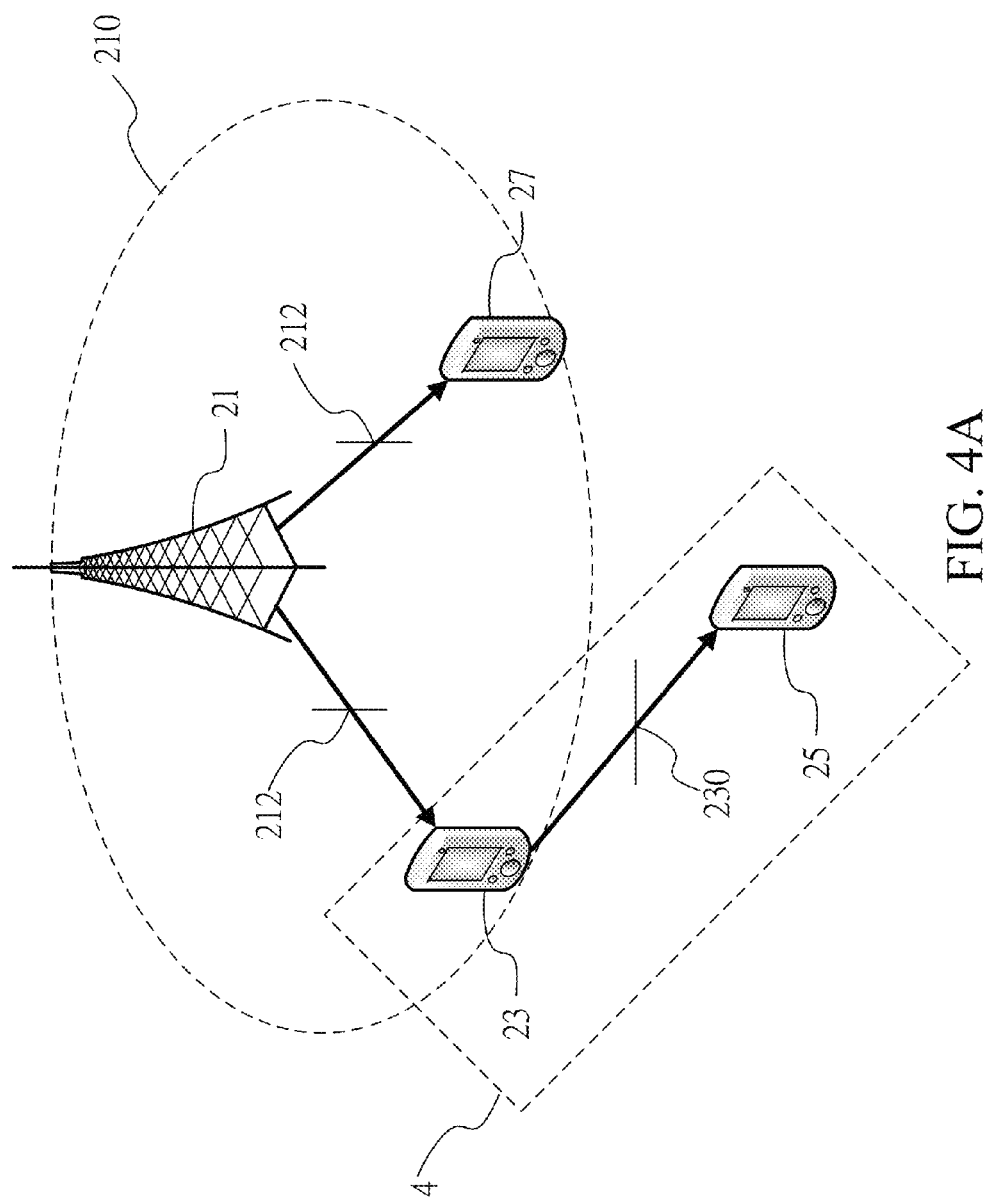
FIG. 4A is a schematic view of a direct communication network system according to a third embodiment of the present invention.
Figure 4B:
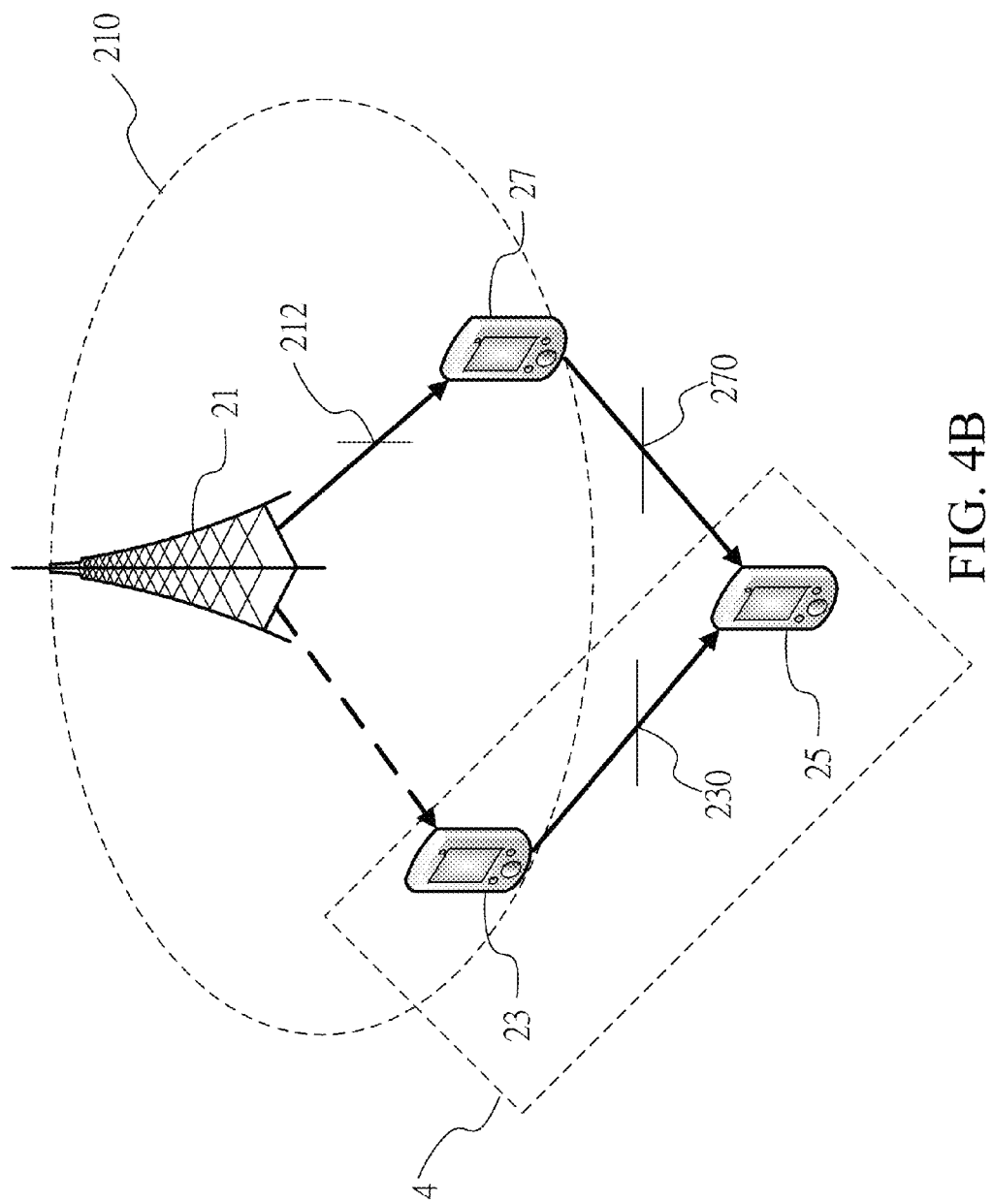
FIG. 4B is another schematic view of the direct communication network system according to the third embodiment of the present invention.

Please refer to FIGS. 4A~4B, which are schematic views of a direct communication network system 4 according to a third embodiment of the present invention. The framework of the third embodiment is similar to that of the first embodiment, so elements bearing the same symbols also have the same functions and will not be described again herein. The second embodiment will mainly describe another technology of coping with the abnormal synchronization statuses in more detail.

Similarly, as shown in FIG. 4A, the first direct communication apparatus 23 receives at least one synchronization signal 212 from the base station 21 via the transceiver 233 within the communication coverage 210 of the base station 21 and synchronizes with the base station 21 accordingly. The second direct communication apparatus 25 receives at least one first synchronization signal 230 from the first direct communication apparatus 23 via the transceiver 253 outside the communication coverage 210 of the base station 21 and synchronizes with the first direct communication apparatus 23 accordingly.

Referring next to FIG. 4B, if the transceiver 233 of the first direct communication apparatus 23 fails to normally receive at least one synchronization signal 212 of the base station 21 during the continuous synchronization process, the processor 231 can determine that an abnormal synchronization status occurs between the first direct communication apparatus 23 and the base station 21. Then, the processor 231 of the first direct communication apparatus 23 can decrease a signal transmission power (not shown) of the at least one first synchronization signal 230 via the transceiver 233.

Then, after the processor 251 of the second direct communication apparatus 25 determines that the signal transmission power of the at least one first synchronization signal 230 has been decreased, the processor 251 can decide to switch the synchronization. Further speaking, if the second direct communication apparatus 25 determines that the third direct communication apparatus 27 is in a normal synchronization status according to at least one second synchronization signal 270 of the third direct communication apparatus 27, then the second direct communication apparatus 25 may switch synchronization to the third direct communication apparatus 27 via the transceiver 253 and synchronizes to the third direct communication apparatus 27 according to the at least one second synchronization signal 270 of the third direct communication apparatus 27.

It shall be particularly noted that, the technology of determining whether to switch synchronization according to the signal transmission power may be accomplished by setting a power threshold value. In more detail, if the direct communication apparatus determines that the signal transmission power of the synchronization signal becomes lower than the power threshold value, then it can be determined that an abnormal status of the synchronization signal source has occurred or is about to occur so as to switch the synchronization source in advance.

Figure 5A:
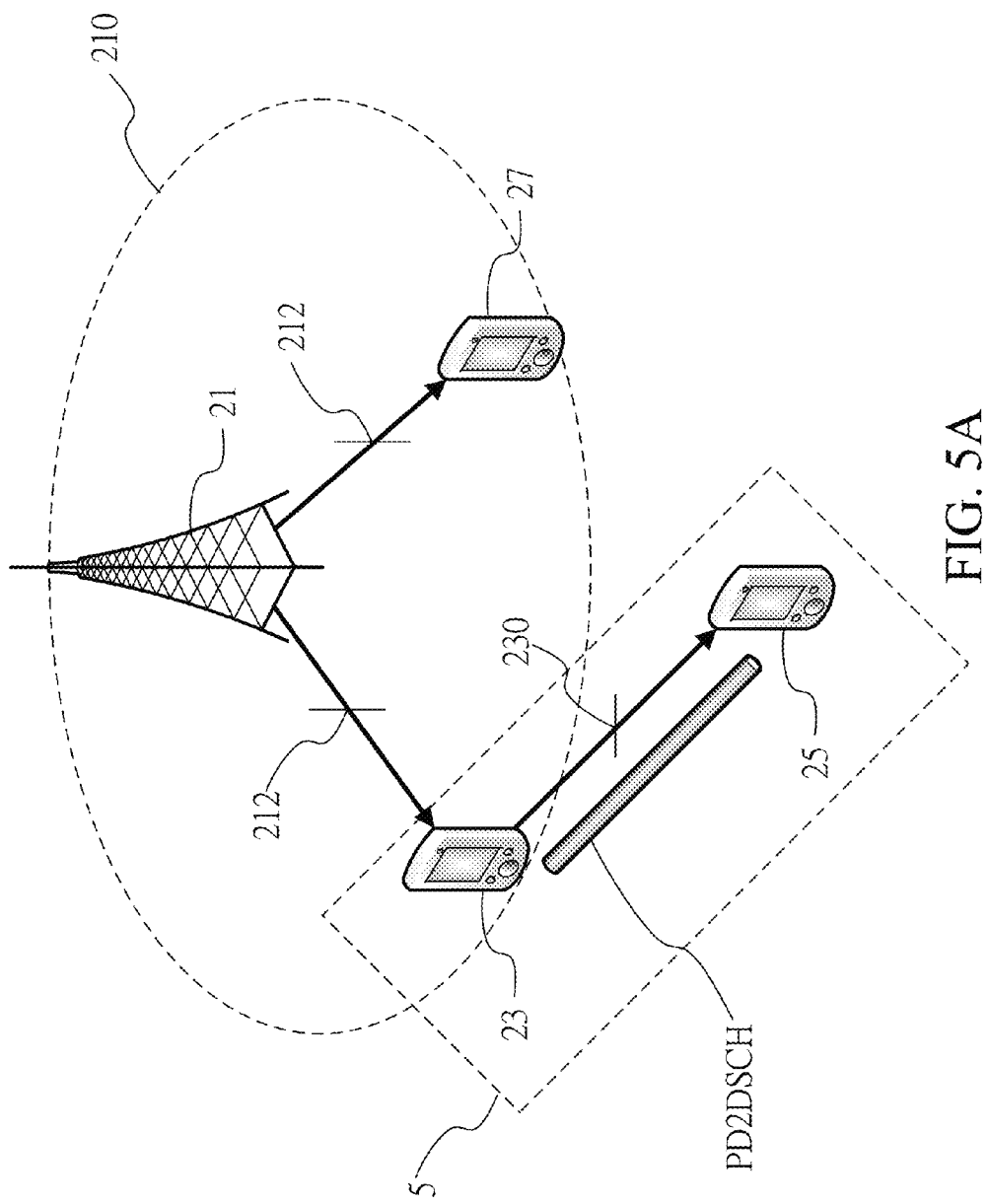
FIG. 5A is a schematic view of a direct communication network system according to a fourth embodiment of the present invention.
Figure 5B:
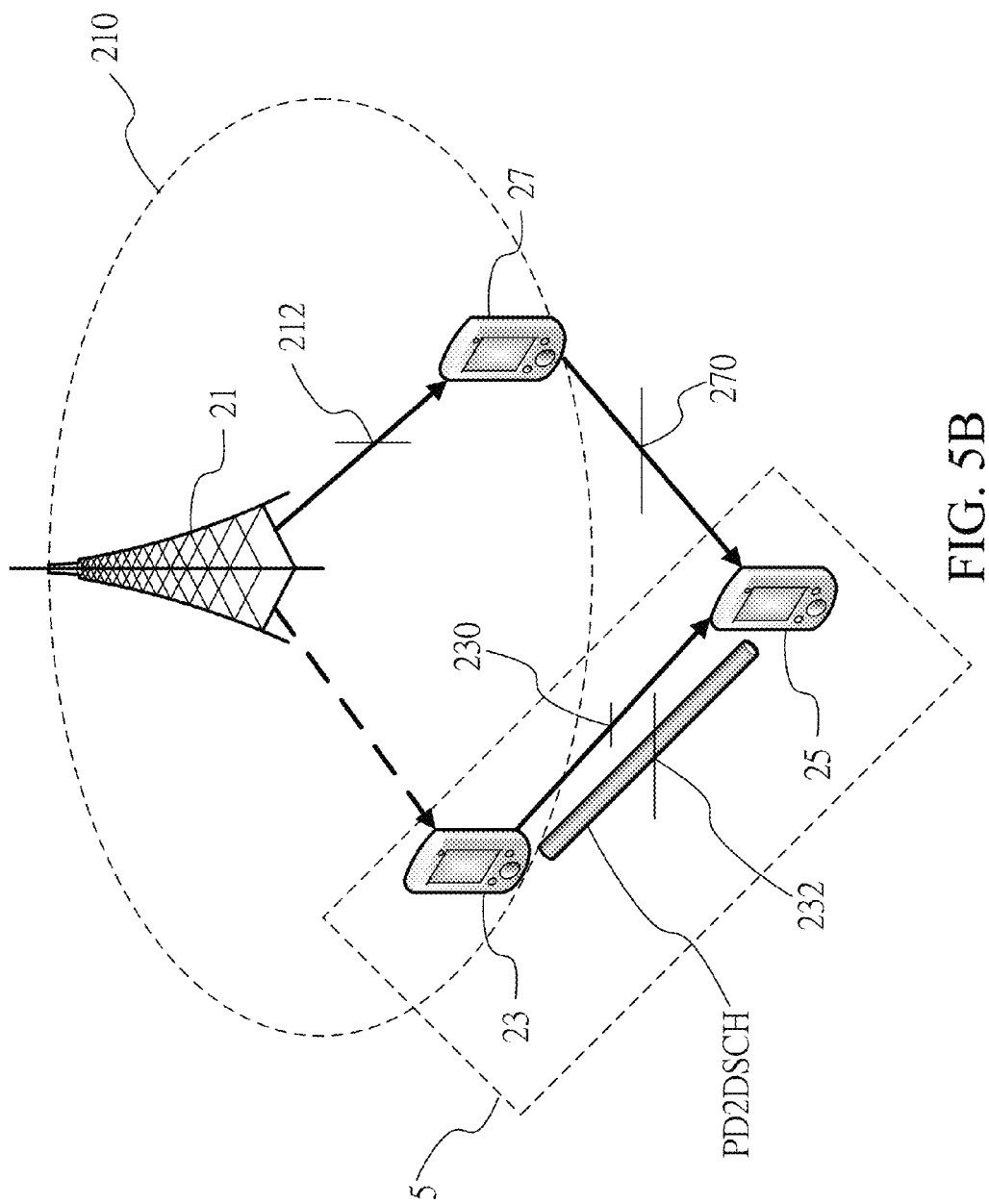
FIG. 5B is another schematic view of the direct communication network system according to the fourth embodiment of the present invention.

Please refer to FIGS. 5A~5B, which are schematic views of a direct communication network system 5 according to a fourth embodiment of the present invention. The framework of the fourth embodiment is similar to that of the first embodiment, so elements bearing the same symbols also have the same functions and will not be described again herein. The fourth embodiment will mainly describe another technology of coping with the abnormal synchronization statuses in more detail.

Similarly, as shown in FIG. 5A, the first direct communication apparatus 23 receives at least one synchronization signal 212 from the base station 21 via the transceiver 233 within the communication coverage 210 of the base station 21 and synchronizes with the base station 21 accordingly. The second direct communication apparatus 25 receives at least one first synchronization signal 230 of the first direct communication apparatus 23 via the transceiver 253 outside the communication coverage 210 of the base station 21 and synchronizes with the first direct communication apparatus 23 accordingly. Here, the first direct communication apparatus 23 and the second direct communication apparatus 25 further exchange information with each other via a physical direct-to-direct synchronization channel (PD2DSCH) therebetween.

Referring next to FIG. 5B, if the transceiver 233 of the first direct communication apparatus 23 fails to normally receive at least one synchronization signal 212 from the base station 21 during the continuous synchronization process, the processor 231 can determine that an abnormal synchronization status occurs between the first direct communication apparatus 23 and the base station 21. Then, the processor 231 of the first direct communication apparatus 23 that is transmitting the at least one first synchronization signal 230 may also transmit a notification message 232 to the second direct communication apparatus 25 in the PD2DSCH via the transceiver 233 to notify the second direct communication apparatus 25 to switch synchronization.

Then, the second direct communication apparatus 25 can switch synchronization after receiving the notification message 232 in the PD2DSCH. Similarly, if the second direct communication apparatus 25 determines that the third direct communication apparatus 27 is in a normal synchronization status according to at least one second synchronization signal 270 of the third direct communication apparatus 27, then the second direct communication apparatus 25 may switch synchronization to the third direct communication apparatus 27 via the transceiver 253 and synchronizes to the third direct communication apparatus 27 according to the at least one second synchronization signal 270 of the third direct communication apparatus 27.

Figure 6A:
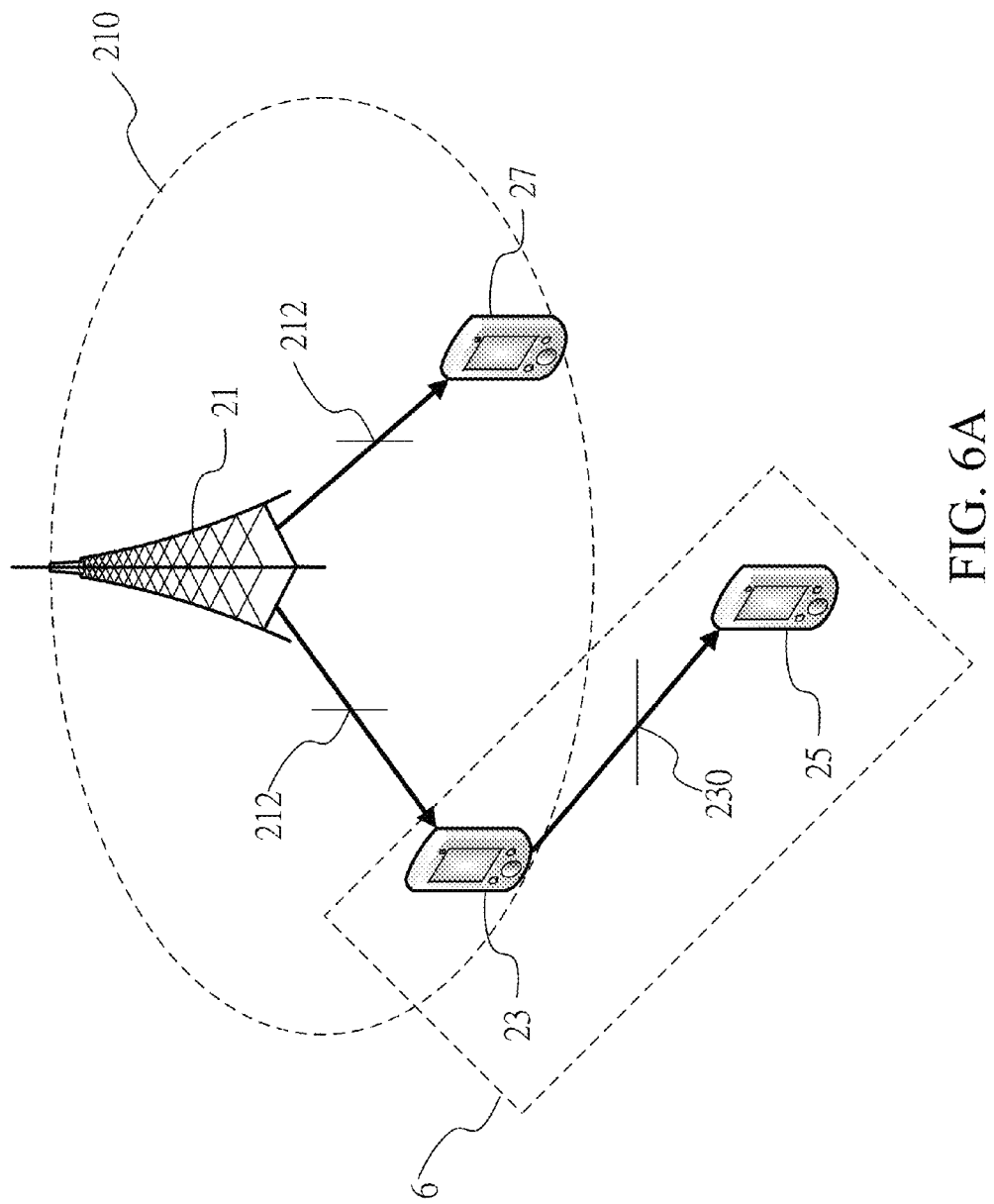
FIG. 6A is a schematic view of a direct communication network system according to a fifth embodiment of the present invention.
Figure 6B:
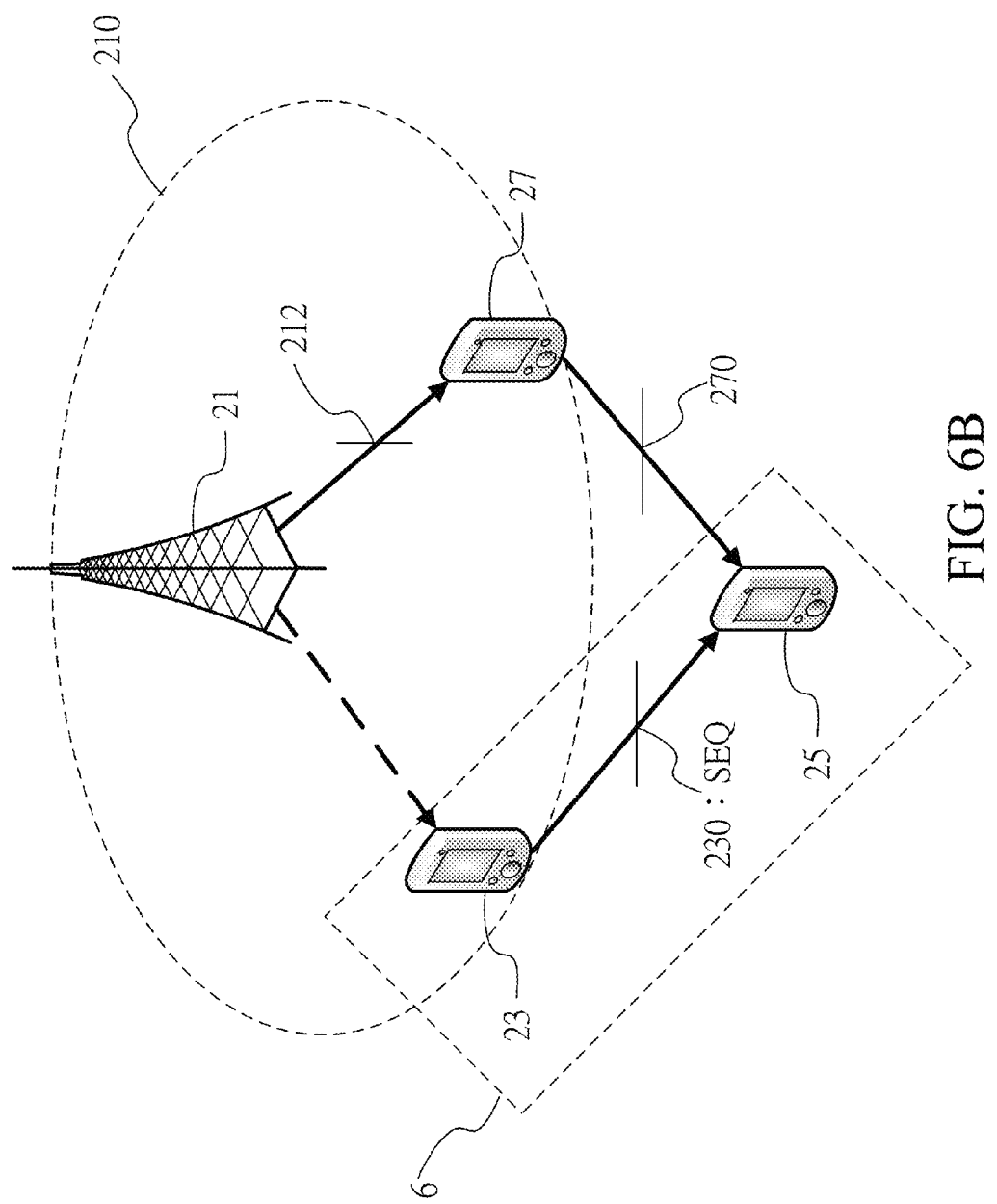
FIG. 6B is another schematic view of the direct communication network system according to the fifth embodiment of the present invention.

Please refer to FIGS. 6A~6B, which are schematic views of a direct communication network system 6 according to a fifth embodiment of the present invention. The framework of the fifth embodiment is similar to that of the first embodiment, so elements bearing the same symbols also have the same functions and will not be described again herein. The fifth embodiment will mainly describe another technology of coping with the abnormal synchronization statuses in more detail.

Similarly, as shown in FIG. 6A, the first direct communication apparatus 23 receives at least one synchronization signal 212 from the base station 21 via the transceiver 233 within the communication coverage 210 of the base station 21 and synchronizes with the base station 21 accordingly. The second direct communication apparatus 25 receives at least one first synchronization signal 230 from the first direct communication apparatus 23 via the transceiver 253 outside the communication coverage 210 of the base station 21 and synchronizes with the first direct communication apparatus 23 accordingly.

Referring next to FIG. 6B, if the transceiver 233 of the first direct communication apparatus 23 fails to normally receive at least one synchronization signal 212 from the base station 21 during the continuous synchronization process, the processor 231 can determine that an abnormal synchronization status occurs between the first direct communication apparatus 23 and the base station 21. Then, the processor 231 of the first direct communication apparatus 23 adjusts the at least one first synchronization signal 230 according to a sequence format SEQ before the at least one first synchronization signal 230 is transmitted by the transceiver 233.

Then, after the processor 251 of the second direct communication apparatus 25 determines that the at least one first synchronization signal 230 has been adjusted by the sequence format SEQ, the processor 251 can decide to switch the synchronization. Further speaking, if the second direct communication apparatus 25 determines that the third direct communication apparatus 27 is in a normal synchronization status according to at least one second synchronization signal 270 of the third direct communication apparatus 27, then the second direct communication apparatus 25 may switch synchronization to the third direct communication apparatus 27 via the transceiver 253 and synchronizes to the third direct communication apparatus 27 according to the at least one second synchronization signal 270 of the third direct communication apparatus 27.

It shall be particularly noted that the use of the sequence format is used to firstly pre-define a transmission form of the sequence in the direct communication apparatuses. Further speaking, the direct communication apparatuses may preset that switching of synchronization shall be performed if a sequence of signals that is received complies with the sequence format that is pre-define. Thus, notification of the synchronization switching can be accomplished by adjusting the signal according to the sequence format.

More specifically, the sequence format mainly specifies the occurrence, the pattern or the frequency of the sequence in the signals. Therefore, when the sequence format has been pre-defined in the transmitting end or receiving end of a direct communication apparatus, whether the sequence of signals transmitted complies with this sequence format can be determined in subsequent transmitting or receiving operations, and if the sequence of signals complies with the sequence format, then a corresponding action (e.g., synchronization switching) will be done.

On the other hand, because adjustment of the occurrence, pattern or frequency may result in various different forms of the sequence format, the direct communication apparatuses may notify each other of their respective needs by use of the various pre-defined sequence formats. The technology of adjusting the sequence in signals to make it comply with the sequence format will be readily understood by those skilled in the art from the aforesaid descriptions, so it will not be further described herein.

Figure 7A:
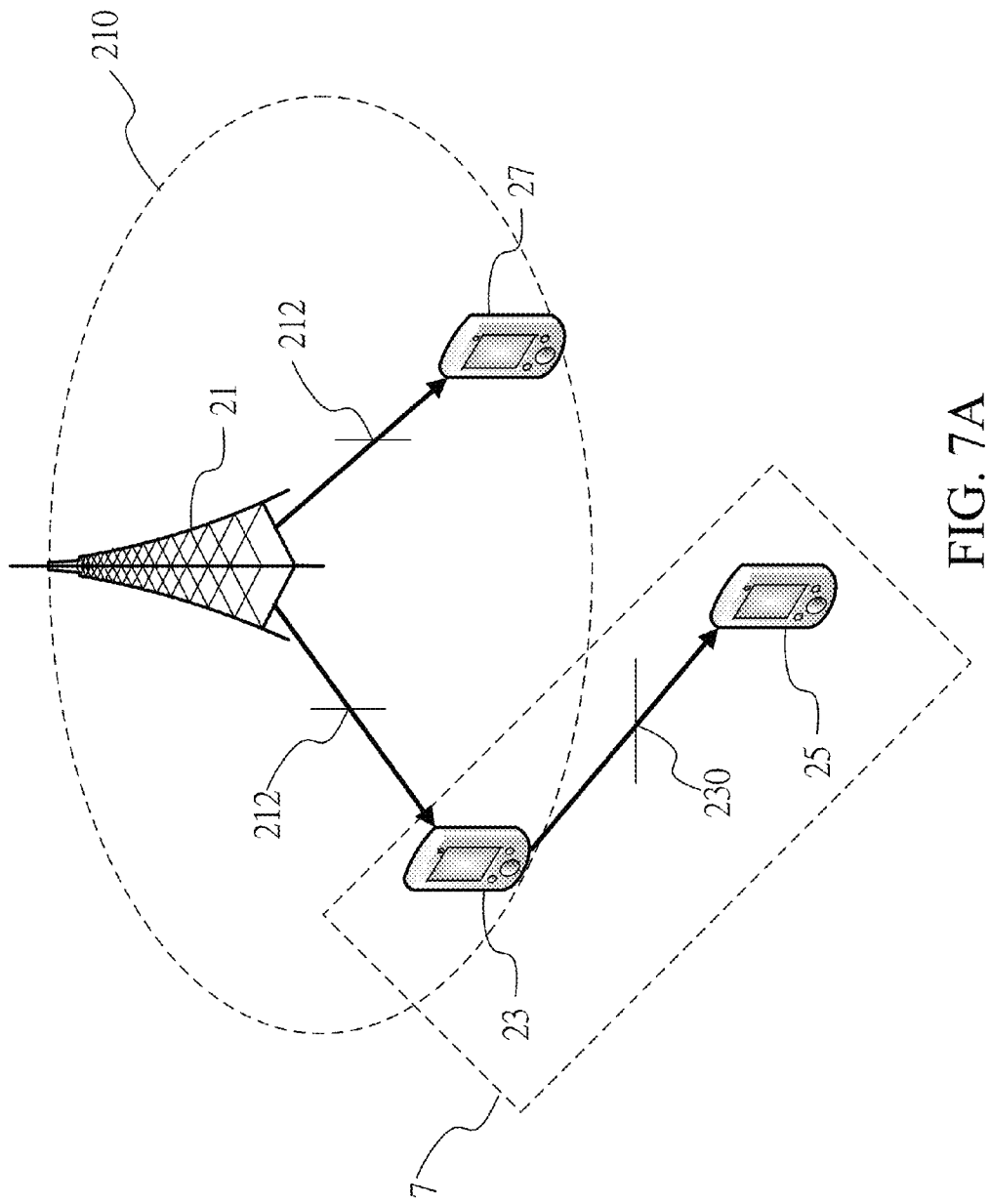
FIG. 7A is a schematic view of a direct communication network system according to a sixth embodiment of the present invention.
Figure 7B:
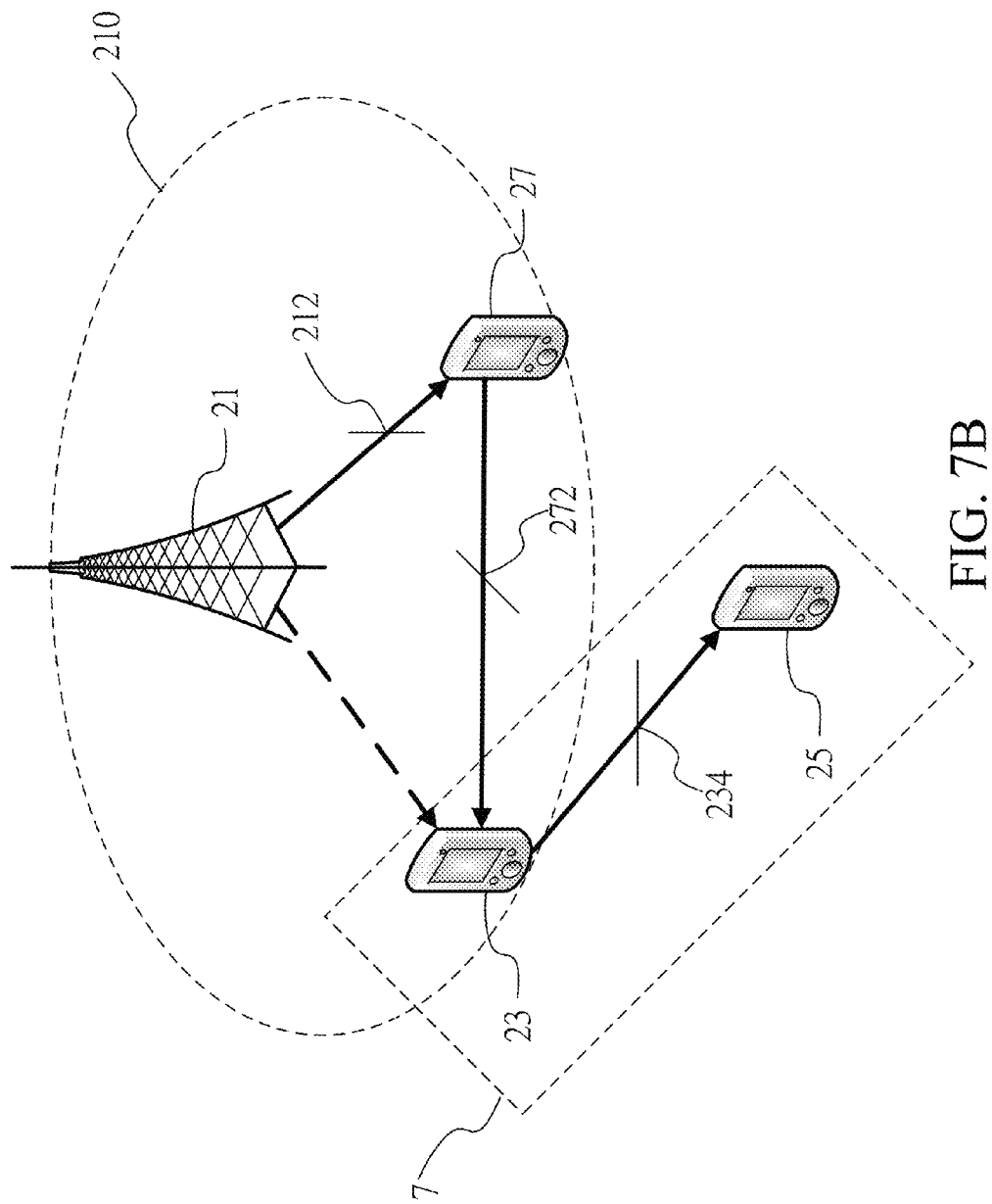
FIG. 7B is another schematic view of the direct communication network system according to the sixth embodiment of the present invention.

Please refer to FIGS. 7A~7B, which are schematic views of a direct communication network system 7 according to a sixth embodiment of the present invention. The framework of the sixth embodiment is similar to that of the first embodiment, so elements bearing the same symbols also have the same functions and will not be described again herein. The sixth embodiment will mainly describe another technology of coping with the abnormal synchronization statuses in more detail.

Similarly, as shown in FIG. 7A, the first direct communication apparatus 23 receives at least one synchronization signal 212 from the base station 21 via the transceiver 233 within the communication coverage 210 of the base station 21 and synchronizes with the base station 21 accordingly. The second direct communication apparatus 25 receives at least one first synchronization signal 230 of the first direct communication apparatus 23 via the transceiver 253 outside the communication coverage 210 of the base station 21 and synchronizes with the first direct communication apparatus 23 accordingly.

Referring next to FIG. 7B, if the transceiver 233 of the first direct communication apparatus 23 fails to normally receive at least one synchronization signal 212 of the base station 21 during the continuous synchronization process, the processor 231 can determine that an abnormal synchronization status occurs between the first direct communication apparatus 23 and the base station 21. Then, the processor 231 of the first direct communication apparatus 23 switches the synchronization source directly according to the abnormal synchronization status.

More specifically, the main idea of the sixth embodiment is to re-switch the synchronization source by the first direct communication apparatus 23, and if the first direct communication apparatus 23 determines that the third direct communication apparatus 27 is in a normal synchronization status according to the at least one second synchronization signal 272 of the third direct communication apparatus 27, then the first direct communication apparatus 23 may switch synchronization to the third direct communication apparatus 27 via the transceiver 233 and synchronizes with the third direct communication apparatus 27 according to the at least one second synchronization signal 272 of the third direct communication apparatus 27.

Next, as it has been correctly re-synchronized, the processor 231 of the first direct communication apparatus 23 transmits at least one third synchronization signal 234 via the transceiver 233 to the second direct communication apparatus 25. Thus, the second direct communication apparatus 25 can synchronize with the first direct communication apparatus 23 via the original synchronization connection between the second direct communication apparatus 25 and the first direct communication apparatus 23 and according to the at least one third synchronization signal 234.

Figure 8:
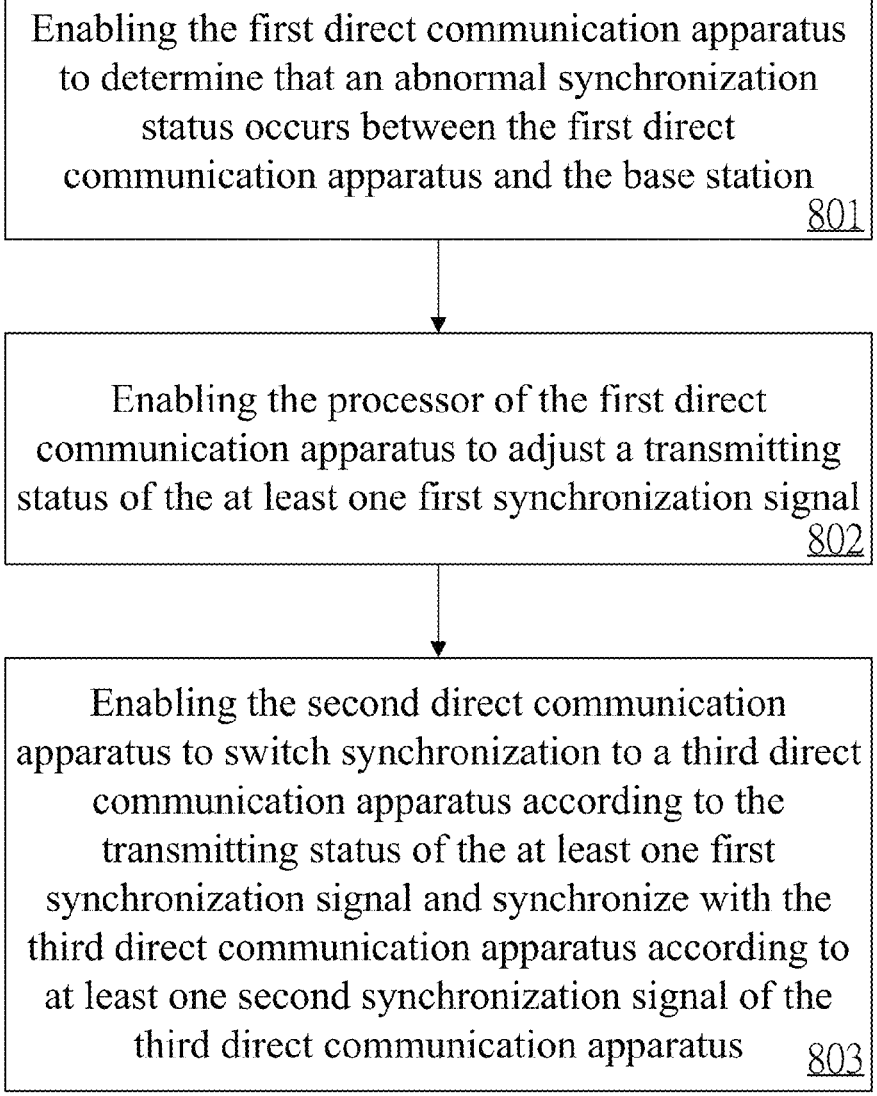
FIG. 8 is a flowchart diagram of a signal synchronization method according to a seventh embodiment of the present invention.

A seventh embodiment of the present invention is a signal synchronization method, a flowchart diagram of which is shown in FIG. 8. The method of the seventh embodiment is for use in a direct communication network system (e.g., the direct communication network system 2 in the previous embodiment) which comprises a first direct communication apparatus and a second direct communication apparatus. The first direct communication apparatus synchronizes with a base station within communication coverage of the base station, and the second direct communication apparatus synchronizes with the first direct communication apparatus outside the communication coverage of the base station according to at least one first synchronization signal of the first direct communication apparatus. Detailed steps of the signal synchronization method of the seventh embodiment are described as follows.

Firstly, step 801 is executed to enable the first direct communication apparatus to determine that an abnormal synchronization status occurs between the first direct communication apparatus and the base station, wherein the abnormal synchronization signal is one of a synchronization interruption status and an abnormal synchronization signal source status. Then, step 802 is executed to enable the processor of the first direct communication apparatus to adjust a transmitting status of the at least one first synchronization signal after the step 801.

Finally, step 803 is executed to enable the second direct communication apparatus to, after the step 802, switch synchronization to a third direct communication apparatus according to the transmitting status of the at least one first synchronization signal and synchronize with the third direct communication apparatus according to at least one second synchronization signal of the third direct communication apparatus. Here, the third direct communication apparatus is synchronized with the base station within the communication coverage of the base station.

Figure 9:
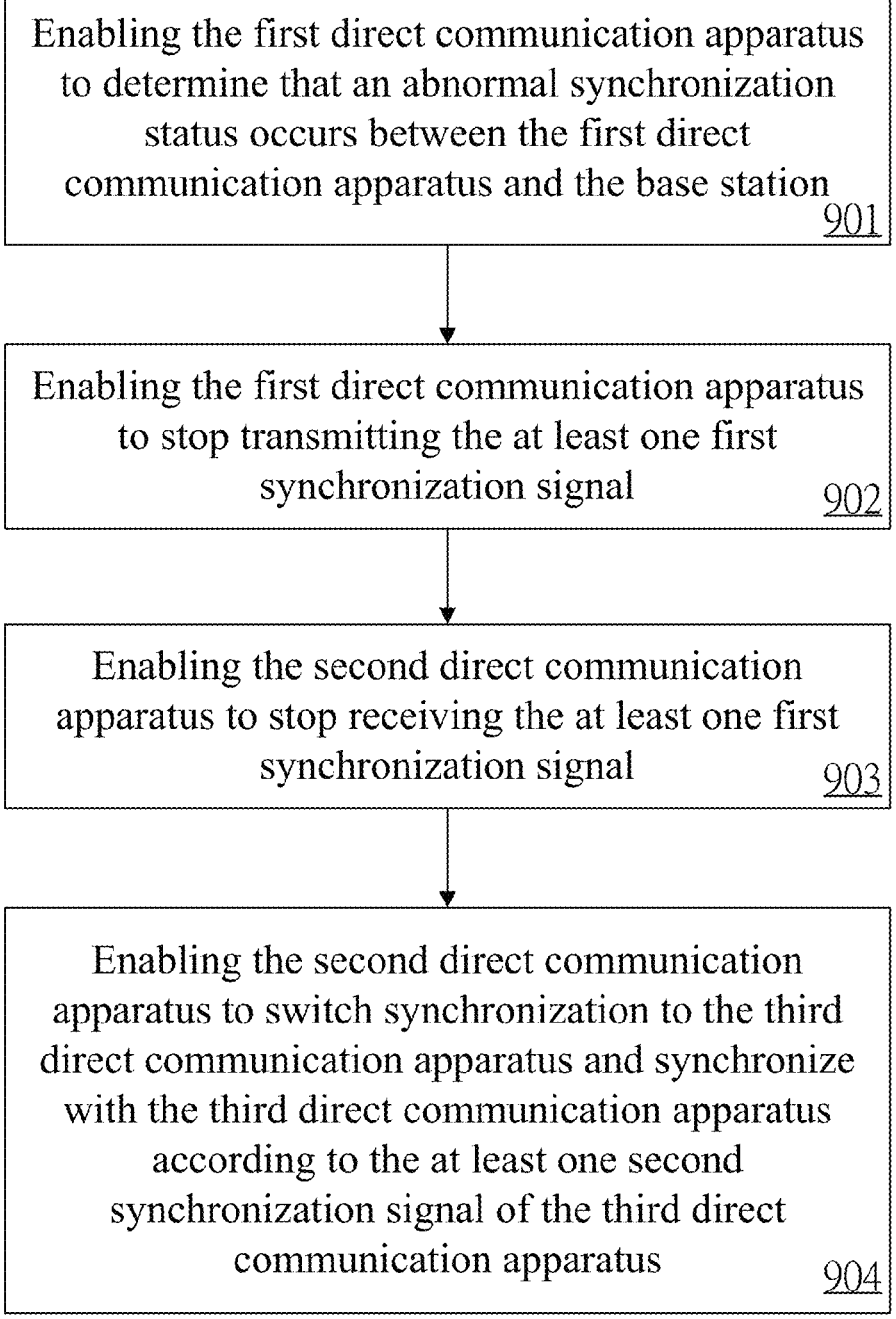
FIG. 9 is a flowchart diagram of a signal synchronization method according to an eighth embodiment of the present invention.

An eighth embodiment of the present invention is a signal synchronization method, a flowchart diagram of which is shown in FIG. 9. The method of the eighth embodiment is for use in a direct communication network system (e.g., the direct communication network system 3 in the previous embodiment) which comprises a first direct communication apparatus and a second direct communication apparatus. The first direct communication apparatus synchronizes with a base station within communication coverage of the base station, and the second direct communication apparatus synchronizes with the first direct communication apparatus outside the communication coverage of the base station according to at least one first synchronization signal of the first direct communication apparatus. Detailed steps of the signal synchronization method of the eighth embodiment are described as follows.

Firstly, step 901 is executed to enable the first direct communication apparatus to determine that an abnormal synchronization status occurs between the first direct communication apparatus and the base station, wherein the abnormal synchronization signal is one of a synchronization interruption status and an abnormal synchronization signal source status. Then, step 902 is executed to enable the first direct communication apparatus to stop transmitting the at least one first synchronization signal.

Next, step 903 is executed to enable the second direct communication apparatus to stop receiving the at least one first synchronization signal. Step 904 is executed to enable the second direct communication apparatus to switch synchronization to the third direct communication apparatus and synchronize with the third direct communication apparatus according to the at least one second synchronization signal of the third direct communication apparatus. Here, the third direct communication apparatus is synchronized with the base station within the communication coverage of the base station.

Figure 10:
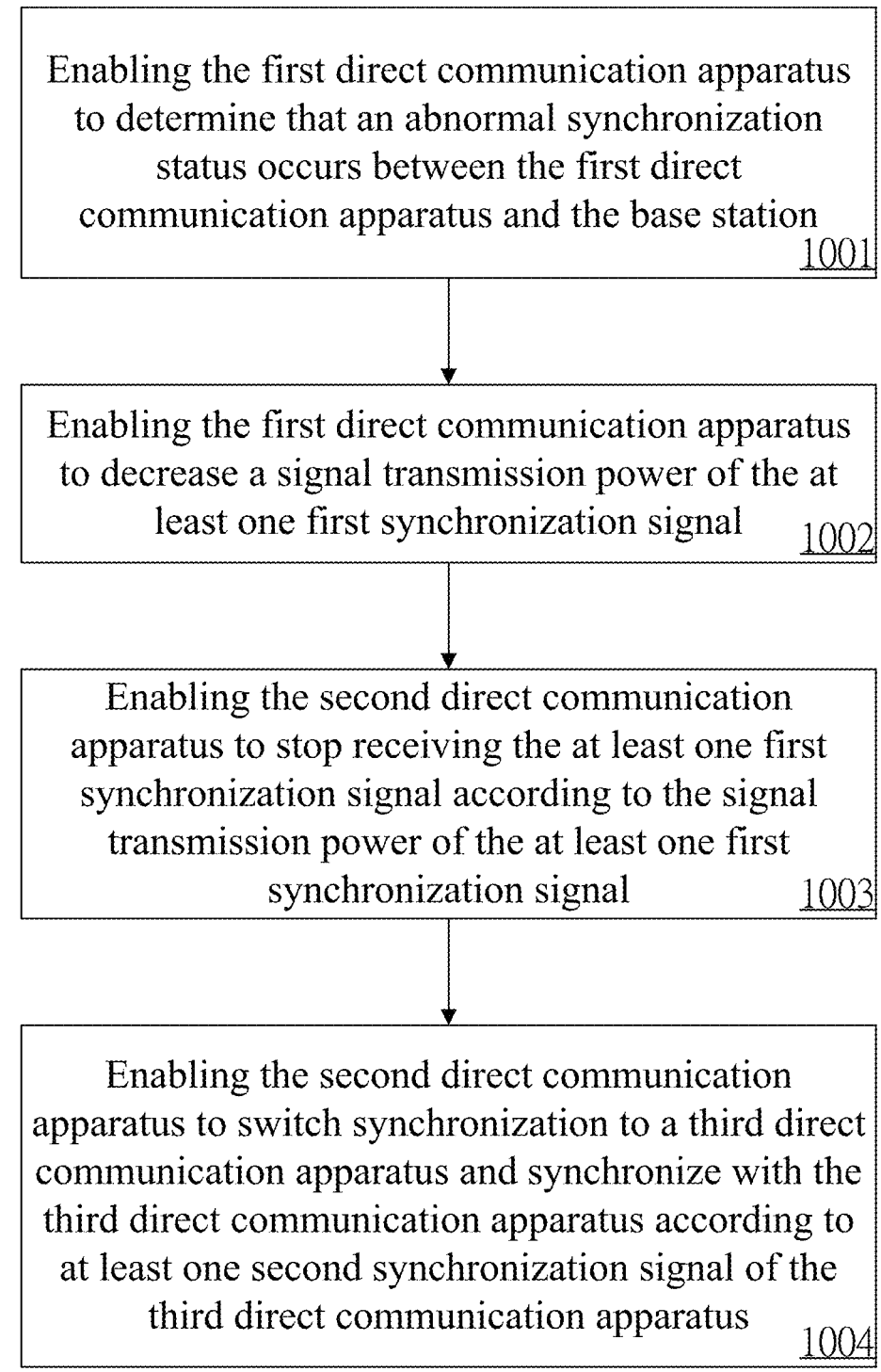
FIG. 10 is a flowchart diagram of a signal synchronization method according to a ninth embodiment of the present invention.

A ninth embodiment of the present invention is a signal synchronization method, a flowchart diagram of which is shown in FIG. 10. The method of the ninth embodiment is for use in a direct communication network system (e.g., the direct communication network system 4 in the previous embodiment) which comprises a first direct communication apparatus and a second direct communication apparatus. The first direct communication apparatus synchronizes with a base station within communication coverage of the base station, and the second direct communication apparatus synchronizes with the first direct communication apparatus outside the communication coverage of the base station according to at least one first synchronization signal of the first direct communication apparatus. Detailed steps of the signal synchronization method of the ninth embodiment are described as follows.

Firstly, step 1001 is executed to enable the first direct communication apparatus to determine that an abnormal synchronization status occurs between the first direct communication apparatus and the base station, wherein the abnormal synchronization signal is one of a synchronization interruption status and an abnormal synchronization signal source status. Then, step 1002 is executed to enable the first direct communication apparatus to decrease a signal transmission power of the at least one first synchronization signal.

Finally, step 1003 is executed to enable the second direct communication apparatus to stop receiving the at least one first synchronization signal according to the signal transmission power of the at least one first synchronization signal. Step 1004 is executed to enable the second direct communication apparatus to switch synchronization to a third direct communication apparatus and synchronize with the third direct communication apparatus according to at least one second synchronization signal of the third direct communication apparatus. Here, the third direct communication apparatus is synchronized with the base station within the communication coverage of the base station.

Figure 11:
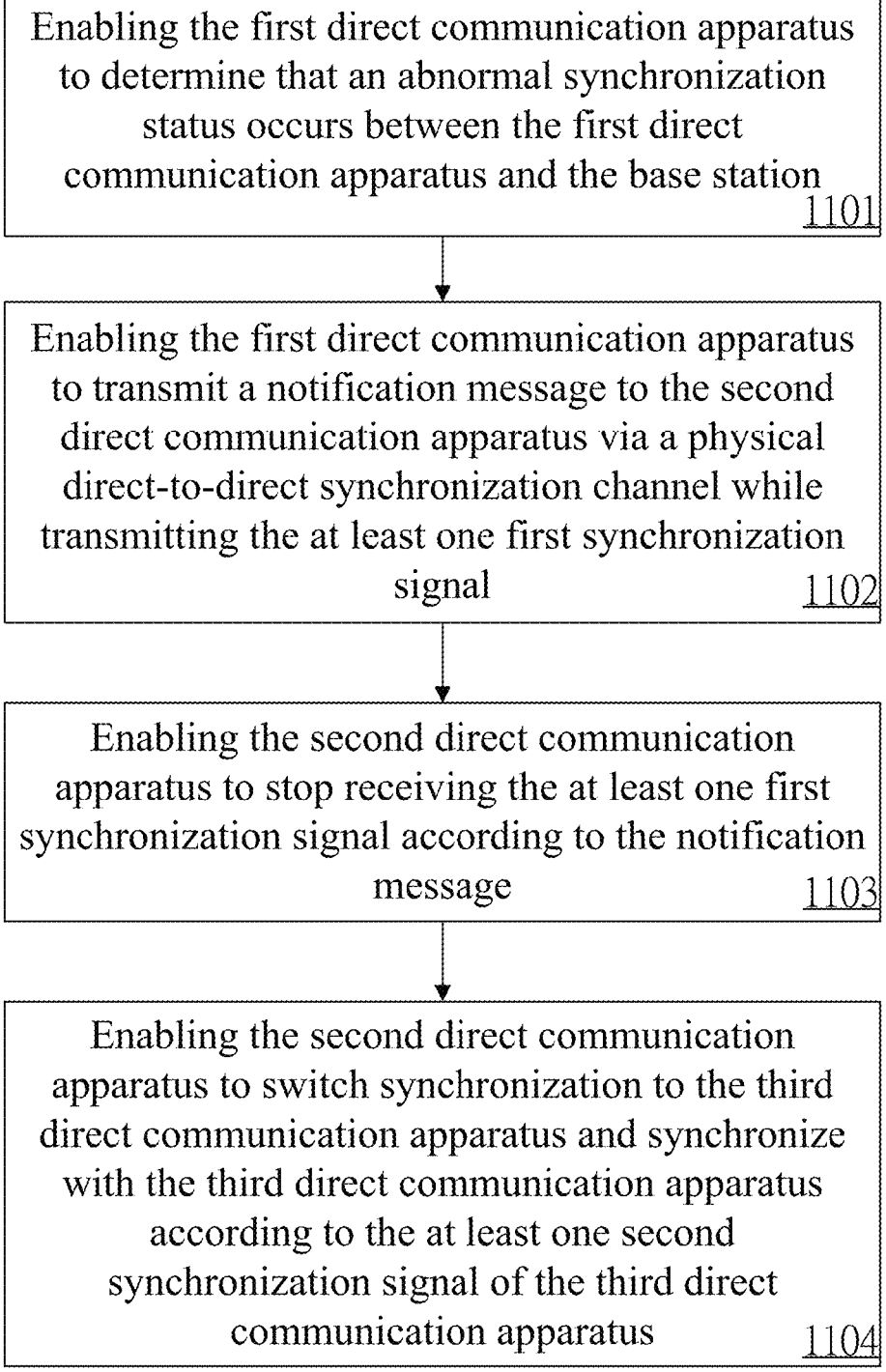
FIG. 11 is a flowchart diagram of a signal synchronization method according to a tenth embodiment of the present invention.

A tenth embodiment of the present invention is a signal synchronization method, a flowchart diagram of which is shown in FIG. 11. The method of the tenth embodiment is for use in a direct communication network system (e.g., the direct communication network system 5 in the previous embodiment) which comprises a first direct communication apparatus and a second direct communication apparatus. The first direct communication apparatus synchronizes with a base station within communication coverage of the base station, and the second direct communication apparatus synchronizes with the first direct communication apparatus outside the communication coverage of the base station according to at least one first synchronization signal of the first direct communication apparatus. Detailed steps of the signal synchronization method of the tenth embodiment are described as follows.

Firstly, step 1101 is executed to enable the first direct communication apparatus to determine that an abnormal synchronization status occurs between the first direct communication apparatus and the base station. The abnormal synchronization signal is one of a synchronization interruption status and an abnormal synchronization signal source status. Then, step 1102 is executed to enable the first direct communication apparatus to transmit a notification message to the second direct communication apparatus via a physical direct-to-direct synchronization channel while transmitting the at least one first synchronization signal.

Then, step 1103 is executed to enable the second direct communication apparatus to stop receiving the at least one first synchronization signal according to the notification message. Afterwards, step 1104 is executed to enable the second direct communication apparatus to switch synchronization to the third direct communication apparatus and synchronize with the third direct communication apparatus according to the at least one second synchronization signal of the third direct communication apparatus. The third direct communication apparatus is synchronized with the base station within the communication coverage of the base station.

An eleventh embodiment of the present invention is a signal synchronization method, a flowchart diagram of which is shown in FIG. 12. The method of the eleventh embodiment is for use in a direct communication network system (e.g., the direct communication network system 6 in the previous embodiment) which comprises a first direct communication apparatus and a second direct communication apparatus. The first direct communication apparatus synchronizes with a base station within communication coverage of the base station, and the second direct communication apparatus synchronizes with the first direct communication apparatus outside the communication coverage of the base station according to at least one first synchronization signal of the first direct communication apparatus. Detailed steps of the signal synchronization method of the eleventh embodiment are described as follows.

Firstly, step 1201 is executed to enable the first direct communication apparatus to determine that an abnormal synchronization status occurs between the first direct communication apparatus and the base station. The abnormal synchronization signal is one of a synchronization interruption status and an abnormal synchronization signal source status. Then, step 1202 is executed to enable the first direct communication apparatus to adjust the at least one first synchronization signal according to a sequence format.

Then, step 1203 is executed to enable the second direct communication apparatus to stop receiving the at least one first synchronization signal according to the at least one first synchronization signal adjusted by the sequence format. Step 1204 is executed to enable the second direct communication apparatus to switch synchronization to the third direct communication apparatus and synchronize with the third direct communication apparatus according to the at least one second synchronization signal of the third direct communication apparatus. The third direct communication apparatus is synchronized with the base station within the communication coverage of the base station.

Figure 13:
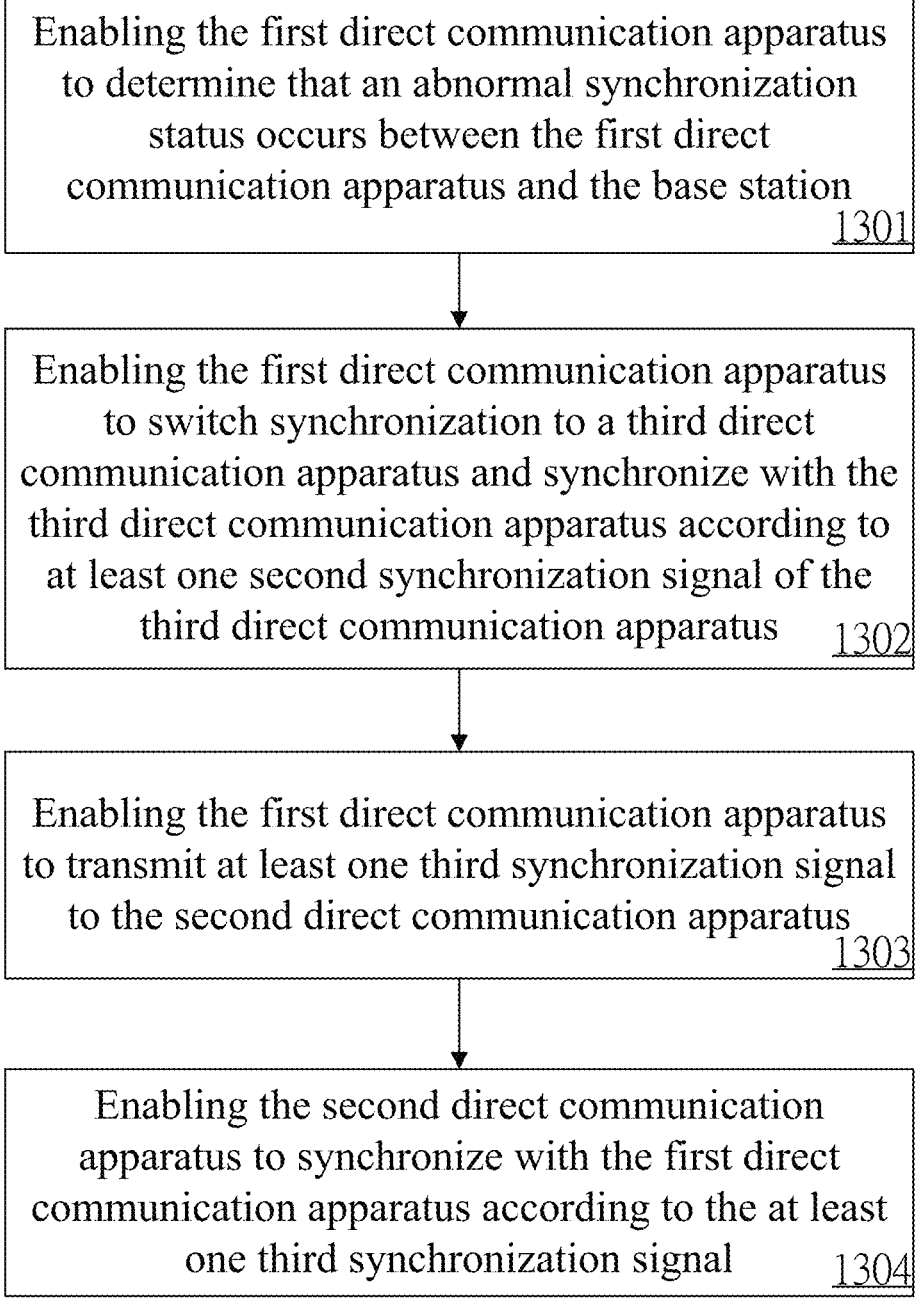
FIG. 13 is a flowchart diagram of a signal synchronization method according to a twelfth embodiment of the present invention.

A twelfth embodiment of the present invention is a signal synchronization method, a flowchart diagram of which is shown in FIG. 13. The method of the twelfth embodiment is for use in a direct communication network system (e.g., the direct communication network system 7 in the previous embodiment) which comprises a first direct communication apparatus and a second direct communication apparatus. The first direct communication apparatus synchronizes with a base station within communication coverage of the base station, and the second direct communication apparatus synchronizes with the first direct communication apparatus outside the communication coverage of the base station according to at least one first synchronization signal of the first direct communication apparatus. Detailed steps of the signal synchronization method of the twelfth embodiment are described as follows.

Firstly, step 1301 is executed to enable the first direct communication apparatus to determine that an abnormal synchronization status occurs between the first direct communication apparatus and the base station. The abnormal synchronization signal is one of a synchronization interruption status and an abnormal synchronization signal source status. Then, step 1302 is executed to enable the first direct communication apparatus to switch synchronization to a third direct communication apparatus and synchronize with the third direct communication apparatus according to at least one second synchronization signal of the third direct communication apparatus. The third direct communication apparatus is synchronized with the base station within the communication coverage of the base station.

Then, step 1303 is executed to enable the first direct communication apparatus to transmit at least one third synchronization signal to the second direct communication apparatus. Finally, step 1304 is executed to enable the second direct communication apparatus to synchronize with the first direct communication apparatus according to the at least one third synchronization signal.

Figure 14:
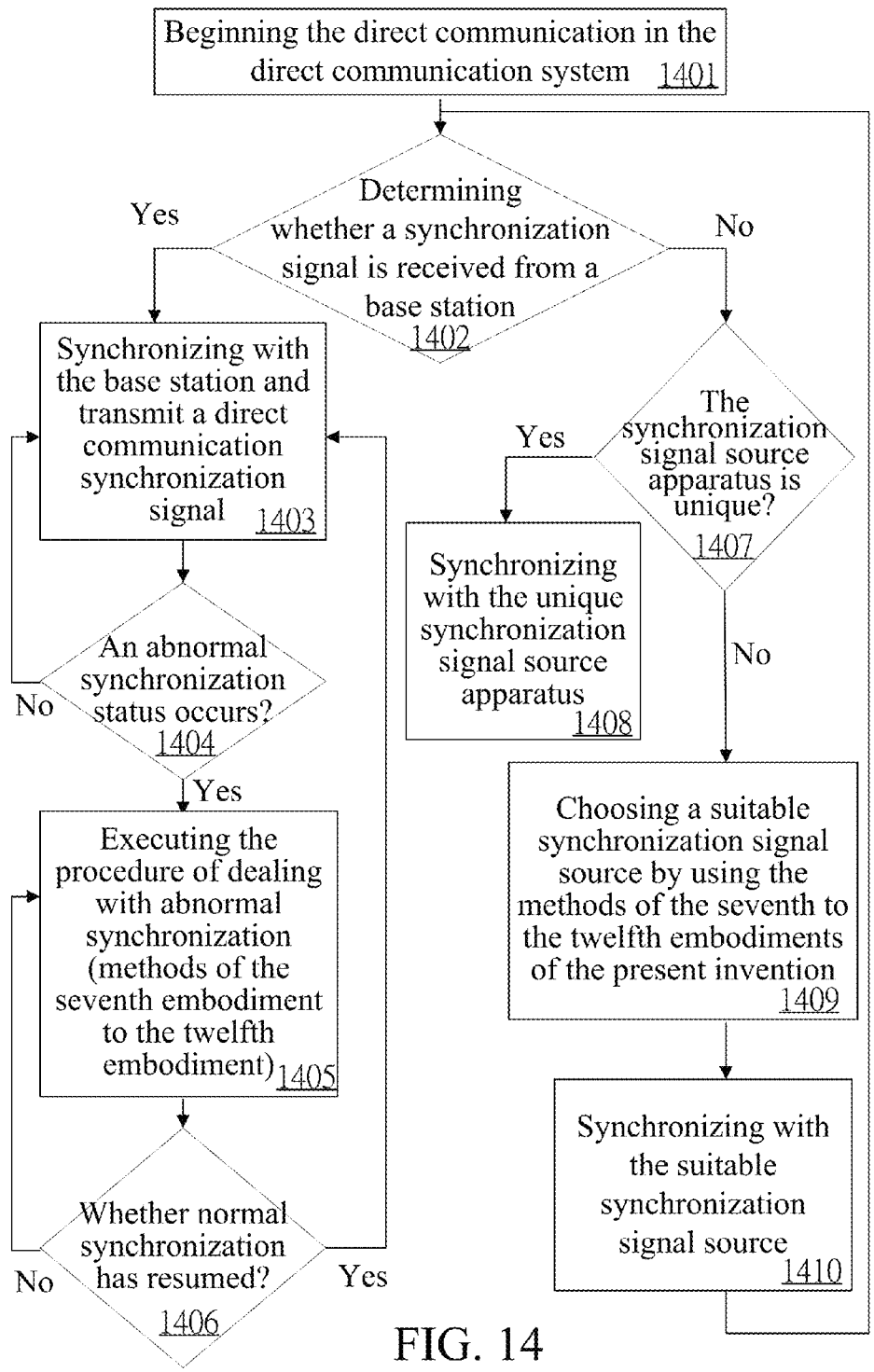
FIG. 14 is a flowchart diagram of a signal synchronization method according to a thirteenth embodiment of the present invention.

A thirteenth embodiment of the present invention is a signal synchronization method for a direct communication apparatus, a flowchart diagram of which is shown in FIG. 14. The method of the thirteenth embodiment is for use in direct communication apparatus (e.g., the direct communication apparatuses of previous embodiments) of a direct communication network system. The thirteenth embodiment mainly emphasizes operations of the synchronizing technology of the present invention by integrating the technical contents of the previous embodiments.

Firstly, step 1401 is executed to enable the direct communication apparatus to begin the direct communication in the direct communication system. Step 1402 is executed to enable the direct communication apparatus to determine whether a synchronization signal is received from a base station. If the determination result is "yes", then the direct communication apparatus is an apparatus synchronized with the base station. Then step 1403 is executed to enable the direct communication apparatus to synchronize with the base station directly and transmit a direct communication synchronization signal.

Next, step 1404 is executed to enable the direct communication apparatus to determine whether an abnormal synchronization status occurs. If the determination result is "no", the step 1403 is executed again. Otherwise, if the determination result is "yes", step 1405 is executed to enable the direct communication apparatus to execute steps accomplished by the first direct communication apparatus in the seventh embodiment to the twelfth embodiment according to different abnormal synchronization signals so as to keep other direct communication apparatuses, which would otherwise be unable to be synchronized with the base station, synchronized with the base station. Next, step 1406 is executed to enable the direct communication apparatus to determine whether normal synchronization of itself has resumed. If the determination result is "yes", then the step 1403 is executed again, and otherwise, the step 1405 is executed again.

On the other hand, if the determination result of the step 1402 is "no", then the direct communication apparatus is not an apparatus directly synchronized with the base station, and step 1407 is executed to enable the direct communication apparatus to determine whether the synchronization signal source apparatus available for synchronization is unique. If the determination result is "yes", it means that there is only one synchronization source available for the direct communication apparatus, and step 1408 is executed to enable the direct communication apparatus to synchronize with the unique synchronization signal source apparatus.

If the determination result of the step 1407 is "no", then step 1409 is executed to enable the direct communication apparatus to execute steps accomplished by the second direct communication apparatus in the seventh embodiment to the twelfth embodiment to choose a suitable synchronization signal source. Thereafter, step 1410 is executed to enable the direct communication apparatus to synchronize with the suitable synchronization signal source. Finally, the step 1402 is executed again for direct synchronization with the base station.

According to the above descriptions, the direct communication network system and the signal synchronization method thereof according to the present invention changes or switches the synchronization sources according to the adjustment in status of the synchronization signal so as to avoid possible abnormal synchronization status that would occur subsequently. Thereby, stability of the direct communication of direct communication apparatuses outside the communication coverage of the present invention can be increased to improve the service quality.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A signal synchronization method for a direct wireless communication network system, the direct wireless communication network system comprising a first Device-to-Device (D2D) communication apparatus and a second D2D communication apparatus, the first D2D communication apparatus synchronizing with a base station within communication coverage of the base station, and the second D2D communication apparatus, which is outside the communication coverage of the base station, synchronizing with the first D2D communication apparatus according to at least one first synchronization signal of the first D2D communication apparatus, the signal synchronization method comprising:

(a) the first D2D communication apparatus determining that an abnormal synchronization status occurs between the first D2D communication apparatus and the base station, wherein the abnormal synchronization signal is one of a synchronization interruption status and an abnormal synchronization signal source status;

(b) the first D2D communication apparatus, after step (a), switching synchronization to a third D2D communication apparatus and synchronize with the third D2D communication apparatus according to at least one second synchronization signal of the third D2D communication apparatus, wherein the third D2D communication apparatus is synchronized with the base station within the communication coverage of the base station;

(c) the first D2D communication apparatus transmitting at least one third synchronization signal to the second D2D communication apparatus after step (b); and (d) the second D2D communication apparatus synchronizing with the first D2D communication apparatus according to the at least one third synchronization signal.

2. A direct wireless communication network system, comprising:

a first Device-to-Device (D2D) communication apparatus that synchronizes with a base station within communication coverage of the base station; and a second D2D communication apparatus that is outside the communication coverage of the base station and synchronizes with the first D2D communication apparatus according to at least one first synchronization signal of the first D2D communication apparatus;

wherein the first D2D communication apparatus determines that an abnormal synchronization status occurs between the first v communication apparatus and the base station, and switches synchronization to a third D2D communication apparatus to synchronize with the third D2D communication apparatus according to at least one second synchronization signal of the third D2D communication apparatus, wherein the abnormal synchronization signal is one of a synchronization interruption status and an abnormal synchronization signal source status, the third D2D communication apparatus is synchronized with the base station within the communication coverage of the base station, the first D2D communication apparatus transmits at least one third synchronization signal to the second D2D communication apparatus, and the second D2D communication apparatus synchronizes with the first D2D communication apparatus according to the at least one third synchronization signal.

3. A first Device-to-Device (D2D) communication apparatus for a direct wireless communication network system, the direct wireless communication network system comprising a second D2D communication apparatus, the first D2D communication apparatus synchronizing with a base station within communication coverage of the base station, and the second D2D communication apparatus, which is outside the communication coverage of the base station, synchronizing with the first D2D communication apparatus according to at least one first synchronization signal of the first D2D communication apparatus, the first D2D communication apparatus comprising:

a processor; and a transceiver;

wherein the processor is configured to determine that an abnormal synchronization status occurs between the first D2D communication apparatus and the base station, the abnormal synchronization signal being one of a synchronization interruption status and an abnormal synchronization signal source status, switches synchronization to a third D2D communication apparatus via the transceiver and synchronizes with the third D2D communication apparatus according to at least one second synchronization signal of the third D2D communication apparatus, the third D2D communication apparatus is synchronized with the base station within the communication coverage of the base station, and the processor is configured to transmit at least one third synchronization to the second D2D communication apparatus so that the second D2D communication apparatus synchronizes with the first D2D communication apparatus according to the at least one third synchronization signal.

* * * * *